(12) United States Patent
Blankenship et al.

(10) Patent No.: US 10,602,473 B2
(45) Date of Patent: Mar. 24, 2020

(54) FACILITATED POSITIONING OF WIRELESS COMMUNICATION DEVICES

(71) Applicant: Telefonaktiebolaget LM Ericsson (publ), Stockholm (SE)

(72) Inventors: Yufei Blankenship, Kildeer, IL (US); Vidit Saxena, Spånga (SE); Meng Wang, Sundbyberg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 11 days.

(21) Appl. No.: 15/752,384

(22) PCT Filed: Aug. 12, 2016

(86) PCT No.: PCT/EP2016/069221
§ 371 (c)(1),
(2) Date: Feb. 13, 2018

(87) PCT Pub. No.: WO2017/029213
PCT Pub. Date: Feb. 23, 2017

(65) Prior Publication Data
US 2019/0007923 A1 Jan. 3, 2019

Related U.S. Application Data

(60) Provisional application No. 62/205,368, filed on Aug. 14, 2015.

(51) Int. Cl.
*H04W 64/00* (2009.01)
*H04L 5/00* (2006.01)
(Continued)

(52) U.S. Cl.
CPC ........... *H04W 64/00* (2013.01); *H04L 5/0044* (2013.01); *H04L 5/0048* (2013.01);
(Continued)

(58) Field of Classification Search
CPC ..... H04W 64/00; H04W 24/10; H04W 28/20; H04L 5/0044; H04L 5/0048; H04L 5/0073
See application file for complete search history.

(56) References Cited

U.S. PATENT DOCUMENTS 9,729,273 B2 * 8/2017 Khoshnevis .......... H04L 5/0057
2010/0271965 A1 10/2010 Siomina et al.
(Continued)

OTHER PUBLICATIONS

3GPP, "3rd Generation Partnership Project; Technical Specification Group Radio Access Network; Evolved Universal Terrestrial Radio Access (E-UTRA); LTE Positioning Protocol (LPP) (Release 12)", 3GPP TS 36.355 V12.4.0, Mar. 2015, 1-126.
(Continued)

*Primary Examiner* — Muthuswamy G Manoharan
(74) *Attorney, Agent, or Firm* — Patent Portfolio Builders, PLLC

(57) ABSTRACT

A wireless communication device operative to receive resource blocks (N) in a shiftable receiving frequency range ($f^{MTC}$) within a system bandwidth ($N^{RB}$) for transmission of resource blocks (N) allocated to transmit positioning reference signals (PRS), the receiving frequency range ($f^{MTC}$) being smaller than the system bandwidth ($N^{RB}$).

64 Claims, 21 Drawing Sheets

(51) Int. Cl.
*H04W 24/10* (2009.01)
*H04W 28/20* (2009.01)

(52) U.S. Cl.
CPC .......... *H04L 5/0073* (2013.01); *H04W 24/10* (2013.01); *H04W 28/20* (2013.01)

(56) References Cited

U.S. PATENT DOCUMENTS

| | | | |
|---|---|---|---|
| 2011/0268101 A1* | 11/2011 | Wang | H04L 5/0053 370/344 |
| 2012/0039284 A1* | 2/2012 | Barbieri | H04W 48/10 370/329 |
| 2012/0188988 A1* | 7/2012 | Chung | H04J 13/00 370/335 |
| 2012/0195286 A1 | 8/2012 | Kim et al. | |
| 2013/0301491 A1* | 11/2013 | Bashar | H04W 4/90 370/280 |
| 2013/0308567 A1 | 11/2013 | Chen et al. | |
| 2014/0198680 A1* | 7/2014 | Siomina | H04L 5/14 370/252 |
| 2014/0204825 A1* | 7/2014 | Ekpenyong | H04L 5/001 370/312 |
| 2014/0254509 A1* | 9/2014 | Chen | H04L 5/0058 370/329 |
| 2015/0296359 A1* | 10/2015 | Edge | H04W 4/02 455/404.2 |
| 2016/0065338 A1* | 3/2016 | Kim | H04L 5/005 370/330 |
| 2016/0149672 A1* | 5/2016 | Shimezawa | H04L 1/1812 370/329 |
| 2016/0309468 A1* | 10/2016 | Chen | H04W 4/70 |
| 2017/0214508 A1* | 7/2017 | Lee | G01S 5/0236 |
| 2017/0374638 A1* | 12/2017 | Han | H04J 11/00 |

OTHER PUBLICATIONS

3GPP, "3rd Generation Partnership Project; Technical Specification Group Radio Access Network; Evolved Universal Terrestrial Radio Access (E-UTRA); LTE Positioning Protocol A (LPPa) (Release 12)", 3GPP TS 36.455 V12.2.0, Mar. 2015, 1-62.

3GPP, "3rd Generation Partnership Project; Technical Specification Group Radio Access Network; Evolved Universal Terrestrial Radio Access (E-UTRA); Physical channels and modulation (Release 12)", 3GPP TS 36.211 V12.6.0, Jun. 2015, 1-136.

3GPP, "3rd Generation Partnership Project; Technical Specification Group Radio Access Network; Evolved Universal Terrestrial Radio Access (E-UTRA); Requirements for support of radio resource management (Release 12)", 3GPP TS 36.133 V12.7.0, Mar. 2015, 1-1014.

Unknown, Author, "New WI Proposal: Further LTE Physical Layer Enhancements for MTC", 3GPP TSG RAN Meeting #65, RP-141660, Edinburgh, Scotland, Sep. 9-12, 2014, 1-9.

Office Action issued in application No. 16751581.6, dated Dec. 10, 2018; 3 pages.

* cited by examiner

FIG 12

| FIG 12A |
|---|
| FIG 12B |

FIG 12A

| IE/Group Name | Presence | Range | IE type and reference | Semantics description |
|---|---|---|---|---|
| OTDOA Cell Information | | | | |
| >CHOICE OTDOA Cell Information Item | M | 1..<maxnoOTDOAtypes> | | |
| >>PCI | M | | INTEGER (0..503, ...) | Physical Cell ID |
| >>Cell ID | M | | ECGI 9.2.6 | |
| >>TAC | M | | OCTET STRING(2) | Tracking Area Code |
| >>EARFCN | M | | INTEGER (0..65535, ..., 65536..262143) | Corresponds to $N_{DL}$ for FDD and $N_{DL/UL}$ for TDD in ref. TS 36.104 [5] |
| >>PRS Bandwidth | M | | ENUMERATED (bw6, bw15, bw25, bw50, bw75, bw100,...) | Transmission bandwidth of PRS |
| >>(MTC-specific) PRS Bandwidth | O | | ENUMERATED (bw1, bw2, bw3, bw4, bw5, bw6,...) | Transmission bandwidth of (MTC-specific) PRS |
| >>PRS Configuration Index | M | | INTEGER (0..4095, ...) | PRS Configuration Index, ref TS 36.211 [6] |
| >>(MTC-specific) PRS pattern | O | | INTEGER (0..4095, ...) vector (subf1, subf2,...) | Time-frequency configuration of (MTC-specific) PRS |

FIG 12B

| | | | |
|---|---|---|---|
| >>Number of DL Frames | M | ENUMERATED (sf1, sf2, sf4, sf6,...) | Number of consecutive downlink subframes NPRS with PRS, ref TS 36.211 [6] |
| >>Number of (MTC-specific) frames | O | ENUMERATED (sf1, sf2, sf4, sf6,...) | Number of consecutive downlink subframes for (MTC-specific) PRS |
| >>Number of Antenna Ports | M | ENUMERATED(n 1-or-n2, n4,...) | Number of used antenna ports, where n1-or-n2 corresponds to 1 or 2 ports, n4 corresponds to 4 ports |
| >>SFN Initialisation Time | M | BIT STRING (64) | Time in seconds relative to 00:00:00 on 1 January 1900 (calculated as continuous time without leap seconds and traceable to a common time reference) where binary encoding of the integer part is in the first 32 bits and binary encoding of the fraction part in the last 32 bits. The fraction part is expressed with a granularity of 1/2**32 second. |
| >>E-UTRAN Access Point Position | M | 9.2.8 | The configured estimated geographical position of the antenna of the cell. |
| >>PRS Muting Configuration | M | 9.2.9 | The configuration of positioning reference signals muting pattern, when applicable |
| >>(MTC-specific) PRS Muting Configuration | O | | The configuration of (MTC-specific) PRS muting pattern |

FIG 13

| PRS configuration index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}-160+\Delta$ |
| 480-1119 | 640 | $I_{PRS}-480+\Delta$ |
| 1120-2399 | 1280 | $I_{PRS}-1120+\Delta$ |
| 2400-4095 | Reserved | |

FIG 22

```
INDICATING A FIRST
AND A SECOND SET OF
RESOURCE BLOCKS IN
THE SAME SUBFRAME
```

FIG 23

```
INDICATING A FIRST SET
OF RESOURCE BLOCKS
CONTAINING A FIRST
NUMBER OF PRS
```
↓
```
INDICATING A SECOND
SET OF RESOURCE
BLOCKS CONTAINING
A SECOND
NUMBER OF PRS
```

FACILITATED POSITIONING OF WIRELESS COMMUNICATION DEVICES

TECHNICAL FIELD

The present invention relates to positioning of a wireless communication devices and in particular to a wireless communication device, an access network node, a control node and to methods of operating the same. The present invention also relates to computer programs for carrying out the methods described and to a system comprising a wireless communication device and at least one access network node.

BACKGROUND

3GPP Long Term Evolution (LTE) is a project within the 3rd Generation Partnership Project (3GPP) and the evolved UTRAN (E-UTRAN) is the radio access network of an LTE system. Such an E-UTRAN typically comprises wireless communication devices (wirelessly) connected to network nodes, commonly referred to as eNodeB. An eNodeB serves one or more areas referred to as cells.

Positioning is the process of determining coordinates in space. Once the coordinates are available, the position can be mapped to a certain place or location. The mapping function and the delivery of the location information on request are parts of the location service which is required for the basic emergency services. Services that further exploit the location knowledge or that are based on location knowledge to offer customers some additional value, are referred to as location-aware and location-based services, respectively.

There exist a variety of positioning techniques in wireless communications networks, differing in their accuracy, implementation cost, complexity, applicability in different environments, etc. In existing networks, the most common are solutions assisted by a wireless communication device where a serving mobile location center (SMLC in GSM and UMTS, enhanced SMLC (eSMLC) in LTE) calculates the wireless communication device position based on measurements reported by the wireless communication device.

The SMLC/eSMLC is either a separate network element (as illustrated in FIG. 2) or an integrated functionality e.g. in a network node such as a RBS (Radio Base Station). Among such methods, Assisted Global Positioning System (A-GPS) typically provides the best accuracy. Combining the mobile technology and GPS, A-GPS enhances the receiver sensitivity by providing orbit and other data to the wireless communication device. Drawbacks of A-GPS is that a GPS-equipped wireless communication device is required, and that it doesn't function in certain environments such as tunnels, indoor areas and dense urban areas. Therefore other complementing methods for positioning are needed. These methods use measurements of the time difference of arrival (TDOA) of signals between the cellular antenna and the wireless communication device. In UMTS observed TDOA (OTDOA) is used. In GSM a variant called Enhanced Observed Time Difference (E-OTD) is used.

The technique currently adopted for LTE-based positioning is OTDOA. OTDOA is a multi-lateration based technique estimating TDOA of signals received from three or more sites. To enable positioning, the wireless communication device should be able to detect signals from at least three geographically dispersed network nodes. This implies that the signals need to have high enough signal-to-interference ratios (SINR). Furthermore, the signals need to be transmitted frequently enough to meet the service delay requirements. In order to meet the accuracy requirements, the signals may need to be accumulated over multiple sub frames.

To enable positioning measurements in LTE, a straightforward solution would be to measure standardized signals that are always transmitted from a network node, e.g. synchronization signals (SS) or cell-specific reference signals (RS). SS and cell-specific RS (CRS) are physical signals used to support physical-layer functionality and they do not carry any information from the Medium Access Control (MAC) layer. Both signals are transmitted according to a pre-defined pattern, i.e. in selected subcarriers and time slots, and the pattern is typically relatively sparse.

In LTE, SS are transmitted in downlink and are primarily used in the cell search procedure, i.e. for the wireless communication device to identify a cell and synchronize to it in downlink in order to read the broadcast channel information. SS are transmitted in sub frame 0 and sub frame 5 of a radio frame. A SS consists of Primary SS (PSS) and Secondary SS (SSS). First, a cell identity is read from PSS, and then the cell identity group is read from SSS. The cell identity can then be used to determine the CRS sequence and its allocation in the time-frequency grid. The SS occupy 62 resource elements in the center of the allocated bandwidth.

CRS are transmitted over the entire system bandwidth and in every sub frame, i.e. more frequently than SS. In normal sub frames with a normal cyclic prefix where each time slot comprises seven OFDM symbols, CRS are transmitted on resource elements (RE) of a time-frequency resource grid for one sub frame in time and 12 subcarriers in frequency (the number of subcarriers corresponding to a physical resource block (PRB)). In a system with a single transmit antenna up to six different shifts in frequency (frequency reuse factor=6) and 504 different signals can be used for the CRS. With two transmit antennas, the maximum frequency reuse factor reduces to three. With four transmit antennas, the possibilities are even more limited. Other CRS patterns are defined for sub frames with extended cyclic prefix and for multicast broadcast single frequency network (MBSFN) sub frames.

However, it has been shown that using SS and CRS for positioning without interference management would result in positioning coverage problems due to low SINR and/or insufficient number of strong signals from different network nodes. The problem is particularly relevant for synchronized networks or networks with high data load, as there is a high probability of parallel transmissions in multiple cells on the RE used for CRS or SS which leads to high interference. Furthermore, the SS transmission frequency is not sufficient for the positioning requirements.

To improve positioning measurements and address the hearability problem, it has been proposed in 3GPP to introduce positioning RS (PRS), which could be designed according to transmission patterns characterized by a lower collision probability. In general, PRS may or may not be transmitted in multiple consecutive sub frames and the periodicity can be configured statically or semi-statically.

In respect to the frequency dimension, given a PRS transmission pattern per PRB, the simplest solution would be to repeat the same pattern in all PRB of the same sub frame, i.e., over the entire bandwidth. Transmitting PRS over a large bandwidth generally improves positioning accuracy due to a higher measurement resolution and a lower probability of being in unfavourable frequency-selective fading conditions. The drawback is that a large bandwidth gives a high wireless communication device complexity. Furthermore, a smaller bandwidth may be sufficient to achieve the required accuracy, and using the entire bandwidth is then a waste of resources.

At a high system load, there is no gain in introducing the new PRS without interference coordination. One of the approaches for reducing interference is to transmit PRS during low-interference sub frames (LIS) in which PDSCH transmissions are suppressed. In the LIS, there are RE used for PRS, RE used for control signalling, but the rest of the REs are free from data transmission. To achieve an even higher interference reduction, LIS can be aligned among the cells. For the LIS alignment, inter-cell coordination may or may not be needed, depending e.g. on if LIS occurrences are configured statically or dynamically. However, PRS collisions may occur if cells employ the same transmission pattern.

SUMMARY

According to a first aspect a wireless communication device is provided. The wireless communication device operative to receive resource blocks (N) in a shiftable receiving frequency range ($f^{MTC}$) within a system bandwidth ($N^{RB}$) for transmission of resource blocks (N) allocated to transmit positioning reference signals (PRS), the receiving frequency range ($f^{MTC}$) being smaller than the system bandwidth ($N^{RB}$).

According to a second aspect an access network node of a wireless communication network is provided. The access network node operative to transmit resource blocks in a receiving frequency range ($f^{MTC}$) of a wireless communication device within a system bandwidth ($N^{RB}$) for transmission of resource blocks, the receiving frequency range ($f^{MTC}$) of the wireless communication being smaller than the system bandwidth.

According to a third aspect a control node for controlling transmission of resource blocks allocated to transmit positioning reference symbols (PRS) is provided. The control node operative to indicate resource blocks (N) in a receiving frequency range of a wireless communication device within a system bandwidth for transmission of resource blocks, the receiving frequency range being smaller than the system bandwidth.

According to a fourth aspect a method for operating a wireless communication device is provided. The method comprising the step of: Receiving resource blocks (N) in a shiftable receiving frequency range ($f^{MTC}$) within a system bandwidth ($N^{RB}$) for transmission of resource blocks (N) allocated to transmit positioning reference signals (PRS), the receiving frequency range ($f^{MTC}$) being smaller than the system bandwidth ($N^{RB}$).

According to a fifth aspect a method for operating an access network node of a wireless communication network is provided. The method comprising the steps of: Transmitting resource blocks in a receiving frequency range ($f^{MTC}$) of a wireless communication device within a system bandwidth ($N^{RB}$) for transmission of resource blocks, the receiving frequency range ($f^{MTC}$) of the wireless communication being smaller than the system bandwidth.

According to a sixth aspect a method for operating a control node for controlling transmission of resource blocks allocated to transmit positioning reference symbols (PRS) is provided. The method comprising the step of: Indicating resource blocks (N) in a receiving frequency range of a wireless communication device within a system bandwidth for transmission of resource blocks, the receiving frequency range being smaller than the system bandwidth.

According to a seventh aspect a computer program product is provided. The computer program product comprising program code to be executed by a processor of a wireless communication device, thereby configuring the device to operate in accordance with a method according to the fourth aspect.

According to an eight aspect a computer program product is provided. The computer program product comprising program code to be executed by a processor of a network node, thereby configuring the network to operate in accordance with a method according to the fifth aspect.

According to a ninth aspect a computer program product is provided. The computer program product comprising program code to be executed by a processor of a control node, thereby configuring the control node to operate in accordance with a method according to the sixth aspect.

According to a tenth aspect a system, comprising a wireless communication device according to the first aspect and a access network node according to the second aspect and optionally a control node according to the third aspect is provided. The system may also comprise a further access network node according to the second network

BRIEF DESCRIPTION OF THE DRAWINGS

FIG. 12 shows a table with additional parameter entries (underlined) for configuring the transmission of PRS;

FIG. 13 shows a another table with parameters for configuring the transmission of PRS;

FIG. 22 shows a flow chart illustration of a second implementation with regard to a control node;

FIG. 23 shows a flow chart illustration of a third implementation with regard to a control node;

DETAILED DESCRIPTION

Figure 1:
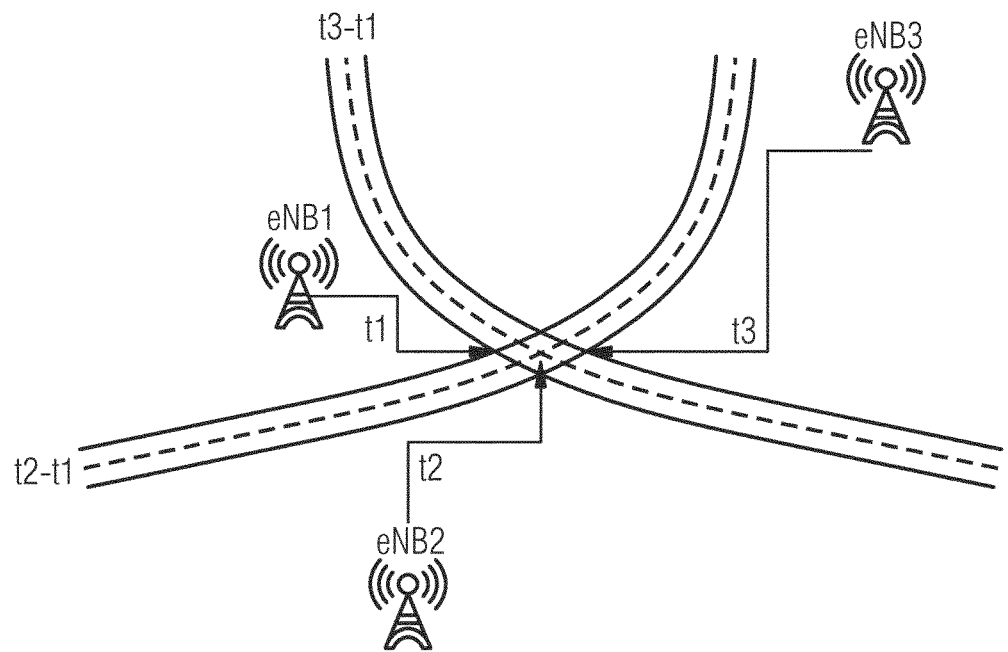
FIG. 1 schematically illustrates an OTDOA position estimation based on multilateration of the RSTD measurements.

The multilateration principle on which positioning is based is illustrated in FIG. 1.

Location-based services and emergency call positioning drive the development of positioning in wireless networks. Positioning support in Third Generation Partnership Project Long Term Evolution (3GPP LTE) was introduced in Release 9. This enables operators to retrieve position information for location-based services and to meet regulatory emergency call positioning requirements.

The following positioning techniques are considered in LTE:

Enhanced Cell ID. Essentially cell ID information to associate the wireless communication device to the serving area of a serving cell, and then additional information to determine a finer granularity position.

Assisted GNSS. GNSS (Global Navigation Satellite System) information retrieved by the wireless communication device, supported by assistance information provided to the wireless communication device from E-SMLC (evolved Serving Mobile Location Centre)

OTDOA (Observed Time Difference of Arrival). The wireless communication device estimates the time difference of reference signals from different access network nodes, such as eNBs, and sends to the E-SMLC (evolved Serving Mobile Location Centre) for multilateration.

UTDOA (Uplink Time Difference Of Arrival). The wireless communication device is requested to transmit a specific waveform that is detected by multiple location measurement units (e.g. an access network node, such as an eNB) at known positions. These measurements are forwarded to E-SMLC for multilateration.

Global positioning system (GPS)-enabled terminals can meet the requirement for positioning, but it cannot provide the required availability due to the satellite signals being blocked in urban and indoor environments. Therefore other techniques are needed in such environments. OTDOA has been introduced in 3GPP release 9 as a downlink (DL) positioning method. As illustrated in FIG. 1, OTDOA in LTE is based on the wireless communication device measuring the time of arrival (TOA) of signals received from access network nodes, eNB1, eNB2, eNB3. The wireless communication device measures the relative difference, e.g. t2-t1 and t3-t1, between the reference cell and another specific cell, defined as reference signal time difference (RSTD) measurement. Every such RSTD determines a hyperbola and the intersection point of these hyperbolas can be considered as the wireless communication device's position as depicted in FIG. 1.

Figure 2:
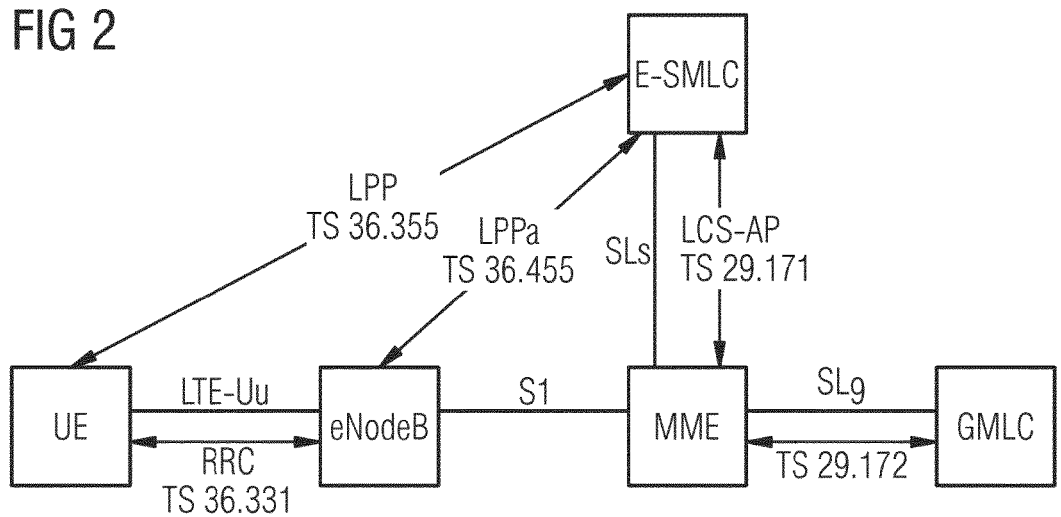
FIG. 2 schematically illustrates a positioning architecture.

Positioning in LTE is supported by the architecture in FIG. 2, with direct interactions between a wireless communication device and a location server (E-SMLC) is via the LTE Positioning Protocol (LPP). Moreover, there are also interactions between the control node, i.e. in this case the location server, and the access network node via the LPPa protocol, to some extent supported by interactions between the access network node and the wireless communication device via a communication protocol, such as the Radio Resource Control (RRC) protocol.

FIG. 2 illustrates a control plane of the exemplary positioning architecture in the LTE communication system. In the control plane as shown, an LTE-Uu protocol interface couples the wireless communication device, denoted as UE in FIG. 2, to the access network node, in this case an eNodeB, and an S1-MME protocol interface couples the access network node to a Mobility Management Entity (MME), which is a name for the SGW (Serving Gateway) in the control plane. The control or positioning node is called an evolved Serving Mobile Location Center (E-SMLC) in the control plane, and is coupled to the MME by a signaling link selection (SLs) protocol interface. It will be understood that there can be a communication interface between the SLP (SUPL Location Platform) and E-SMLC for interworking in the positioning node, also called control node. 3GPP has standardized two protocols specifically to support positioning in LTE: an LTE Positioning Protocol (LPP) and an LTE Positioning Protocol Annex (LPPa). Messaging according to those protocols is also depicted in FIG. 2.

The LPP is a point-to-point protocol between a location services (LCS) server, such as the E-SMLC, and a LCS target device, such as the wireless communication device, that is used to position the target device. Transmitted LPP messages are transparent to an MME, and use radio resource control (RRC) protocol messages for transport over an LTE-Uu interface between the wireless communication device and the access network node, and then S1 application protocol (S1AP) messages over the S1-MME interface between the access network node, i.e. eNB in FIG. 2, and the MME, and then LCS-AP messages over the SLs interface between the MME and the E-SMLC. LPP is defined in 3GPP TS 36.355 V9.2.1, LTE Positioning Protocol (LPP) (Release 9) (June 2010), for example.

LPPa is a protocol for an interface between an access network node such as an eNodeB and a positioning server, such as the E-SMLC. LPPa messages are also transparent to the MME, which routes LPPa message packets over the S1-MME and SLs interfaces without knowledge of the involved LPPa transactions. LPPa is specified only for control-plane positioning procedures, but with user plane/control plane interworking, LPPa can also assist the user plane by querying an access network node such as an eNodeBs for information and access network node measurements not related to a wireless communication device connection. LPPa is defined in 3GPP TS 36.455 V9.2.0, LTE Positioning Protocol A (LPPa) (Release 9) (June 2010), for example.

In the user-plane positioning architecture, the SUPL service uses established data-bearing channels (i.e., the LTE user plane) and positioning protocols (i.e., LPP) for exchanging the positioning-related data between a LCS target and a LCS server (e.g., a SLP).

According to OTDOA the reference cell is selected by the wireless communication device and the RSTD (Reference Signal Time Difference) measurement can be performed on an intra-frequency cell (reference cell/neighbor cell are on the same carrier frequency as the serving cell) or interfrequency cell (at least one of reference cell/neighbor cell is on the different carrier frequency from the serving cell).

In principle, it is possible to measure RSTD on any downlink signals e.g., cell-specific reference signals (CRS). However as in OTDOA the wireless communication device requires to detect multiple neighbor-cell signals, these signals suffer from poor hearability. Hence, positioning reference signal (PRSs) have been introduced to improve OTDOA positioning performance.

Figure 3:
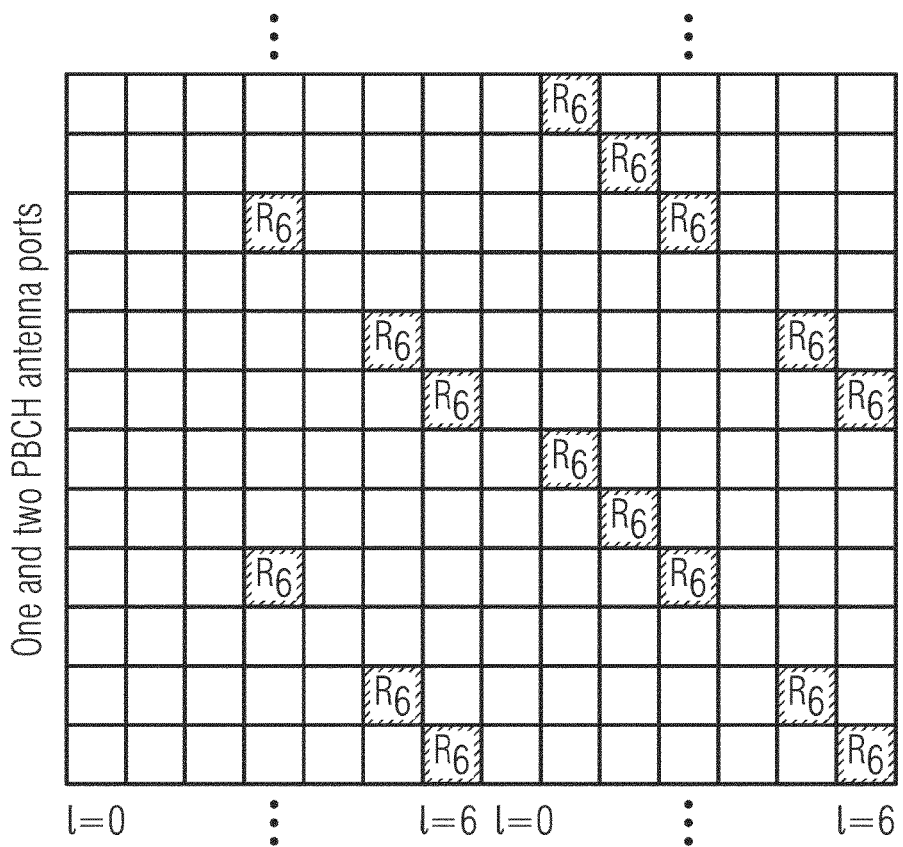
FIG. 3 schematically illustrates a resource block containing positioning reference signals (PRS)

FIG. 3 shows the arrangement of the PRSs (positioning reference signals) in one resource block for normal CP (Cyclic Prefix). As such, in a subframe containing PRS, in order to reduce the interference with neighbor cells, no PDSCH (Physical Downlink Shared Channel) data is carried. PDCCH (Physical Downlink Control Channel) and CRSs (Cell-specific reference signals) are retained in the subframe, while PRSs are distributed in a "diagonal" way in a resource block in between CRSs. Similar to CRS, cell-specific frequency shift (the number of frequency shift given by PCI (Physical Cell ID) modulo 6) is applied to PRS pattern, which helps avoid time-frequency PRS collision up to six neighbor cells.

The PRS are also mapped in this diagonal pattern (with shifts in frequency and time) to avoid collisions with cell specific reference signals and an overlap with the control channels (PDCCH). As can be seen in FIG. 3, a resource block can be defined either according to the LTE specification, i.e. comprising 12 subcarriers in a 0.5 ms timeslot and thus a total 84 resource elements, or as a part thereof, e.g. the part comprising one or more PRS. The PRS are denoted by R6 in FIG. 3 thereby implying that they are assigned to antenna port 6—as specified by 3GPP.

Figure 4:
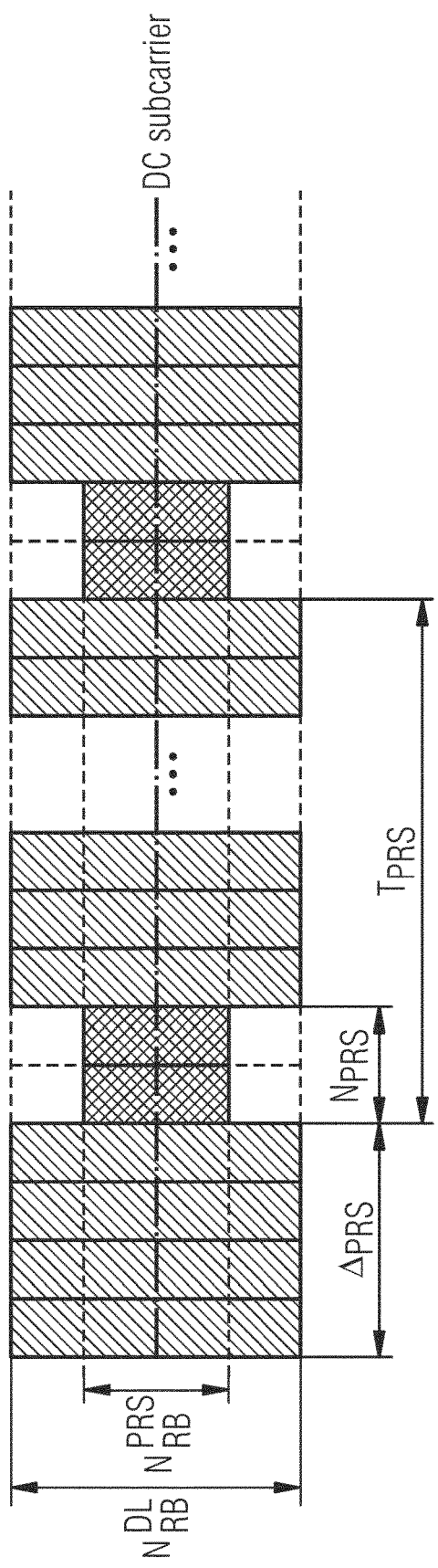
FIG. 4 schematically illustrates positioning reference signals (PRS) within a system bandwidth.

In the LTE system, consecutive PRS subframes, a.k.a. positioning occasions, may be transmitted periodically in the downlink. One such positioning occasion may contain a certain number of consecutive subframes in which PRS are transmitted. The period of one positioning occasion can be configured to e.g. every $T^{PRB}$=160, 320, 640 and 1280 milliseconds. The bandwidth of PRS may be smaller than the system bandwidth. In this case, the PRS PRBs (Physical Resource Blocks) may occupy the central PRBs as illustrated in FIG. 4. The system bandwidth in LTE is scalable between 1.4 and 20 MHz. The system bandwidth may be defined as the frequency range configured for exchanging wireless communication signals between the network, i.e. via an access network node, and one or more wireless communication devices.

Thus, a set of resource blocks in a first subframe of a positioning occasion, i.e. the first set of resource blocks, may be centered around a central frequency of the system bandwidth, this may be the legacy PRS signal. The first set of resource blocks may comprise more resource blocks than the second set of resource blocks. The first set of resource blocks may cover the entire system bandwidth ($N^{RB}$). The second set of resource blocks may be—although not shown in FIG. 4—eccentric with regard to a central frequency of the system bandwidth ($N^{RB}$). Preferably the first range and the second range of the system bandwidth are non-overlapping. However, the first range and the second range of the system bandwidth may very well at least partially, preferably completely, overlap. In particular the first and the second set of resource blocks are contiguous. The second set of resource blocks may cover the same or a smaller system bandwidth range than the first set of resource block.

As shown in FIG. 4 one or more resource blocks $N^{PRS,RB}$ may be allocated for transmission of PRS. PRS thus may be defined by bandwidth $N^{PRS, RB}$ offset $\Delta_{PRS}$, duration $N^{PRS}$ (i.e. the number of consecutive subframes in which PRS are transmitted) and periodicity $T^{PRS}$. PRS resource blocks may be mapped to be symmetric around the carrier frequency, the unused DC subcarrier in the downlink.

Figure 5:
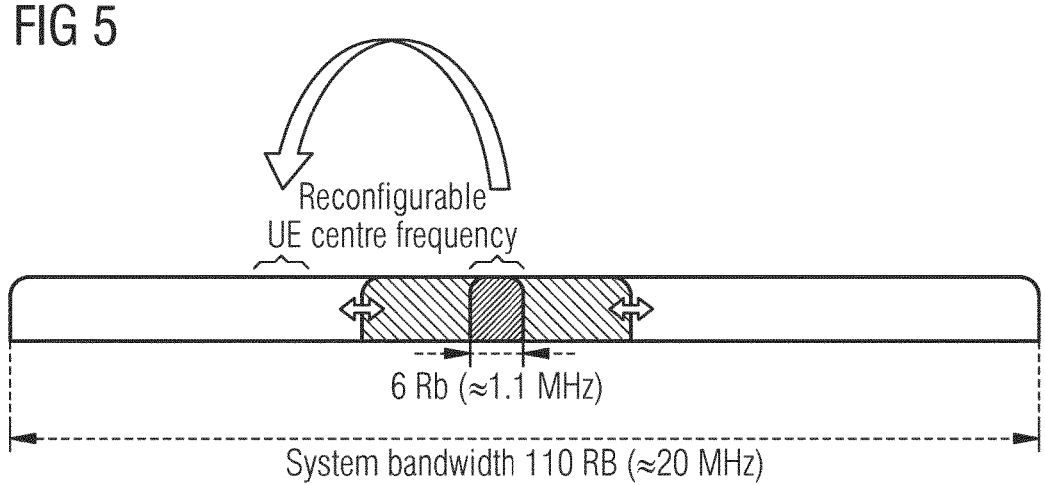
FIG. 5 schematically illustrates the shifting of the receiving frequency range of a wireless communication device.

Now turning to FIG. 5; a wireless communication device, e.g. in accordance with the Rel-13, may have a reduced RF (Radio Frequency) bandwidth of 1.4 MHz for lower component costs as well as reduced complexity of the receiver and the transmitter. The reduced RF bandwidth implies that the wireless communication device will be able to span a maximum bandwidth of 6 contiguous PRBs. In systems with a system bandwidth larger than 1.4 MHz, the wireless communication device will be limited to a narrowband (corresponding to the receiving frequency range of the wireless communication device) within the overall system bandwidth. The location of this narrowband can be configured statically or dynamically within the system bandwidth. For unicast channels in downlink and uplink, a set of "data narrowbands" may be defined in a wireless communication device-specific or cell-specific manner. In case the wireless communication device, e.g. a Rel-13 MTC, is scheduled on a frequency region that lies outside its RF bandwidth, it can re-tune its center frequency to span the desired region (FIG. 3). This "frequency retuning" or shifting requires some guard interval during which the wireless communication device will not be able to transmit/receive any signal. The duration of guard interval for frequency retuning is expected to be at most a few OFDM symbols. As can be seen in FIG. 5 the receiving frequency range of the wireless communication device can be shifted. This feature is referred to as "Reconfigurable UE (center) frequency" in FIG. 5. By way of example the system bandwidth is configured to be 20 MHz.

The wireless communication device may also be limited to a single receive chain for further cost/complexity savings (instead of the two receive chains in legacy wireless communication devices). This elimination of a receive chain will lead to a loss of received signal strength in the downlink.

The PRS described above are generated for a single PRB and transmitted over multiple PRBs by repeating the PRS symbols in frequency. Typically, the PRS is transmitted across the complete system bandwidth. In this case, it is possible for the wireless communication device to receive them without the need to retune, also referred to as shift, its center frequency. Clearly, the wireless communication device will be able to receive only a maximum of 6 PRBs containing the PRS signal.

It is possible to configure a PRS bandwidth smaller than the system bandwidth as well to reduce the resources spent on positioning. If a smaller PRS bandwidth is configured, the PRS signal occupies the central few PRBs only. The wireless communication device will be able to receive PRS in only those PRBs that fall within its RF bandwidth in any subframe. It is also possible for the wireless communication device to retune its center frequency to receive a larger number of PRBs containing the PRS signal. As explained earlier, a few OFDM (Orthogonal Frequency-Division Multiplexing) symbols will be lost to the guard interval in case of frequency retuning. However, the PRS symbols do not occupy the first three OFDM symbols within a subframe. As such, it is possible for the wireless communication device to retune to any part of the system bandwidth and still receive the complete PRS signal available in that subframe.

The PRS transmission may therefore occupy full or part of the system bandwidth. The wireless communication device is able to receive the PRS across the entire bandwidth for positioning. However, the wireless communication device is not able to receive more than 6 PRBs of PRS in a subframe, regardless of system bandwidth. Based on such a small bandwidth for PRS, the positioning performance is likely to be significantly degraded.

Additionally the positioning performance of for wireless communication devices based on downlink PRS signal could be further degraded due to single receive RF chain.

Accordingly, there is a need for new PRS design/mechanism to meet positioning requirements of Rel-13 MTC wireless communication devices.

Wireless communication devices may only be able to transceive on a narrowband with a limited number of contiguous PRBs. The proposed solution allows wireless communication devices to monitor a PRS narrowband for RSTD measurement, and to improve the accuracy of such RSTD measurement according to an embodiment by frequency hopping, i.e., monitoring different narrowbands across the bandwidth in consecutive PRS subframes. Further, at the transmitter side, in addition to the existing PRS transmission that occupies the full or a large part of the system bandwidth, new PRS that is transmitted on PRS narrowband are proposed especially for wireless communication devices limited capabilities such as a receiving frequency range of only a few PRBs.

Figure 8:
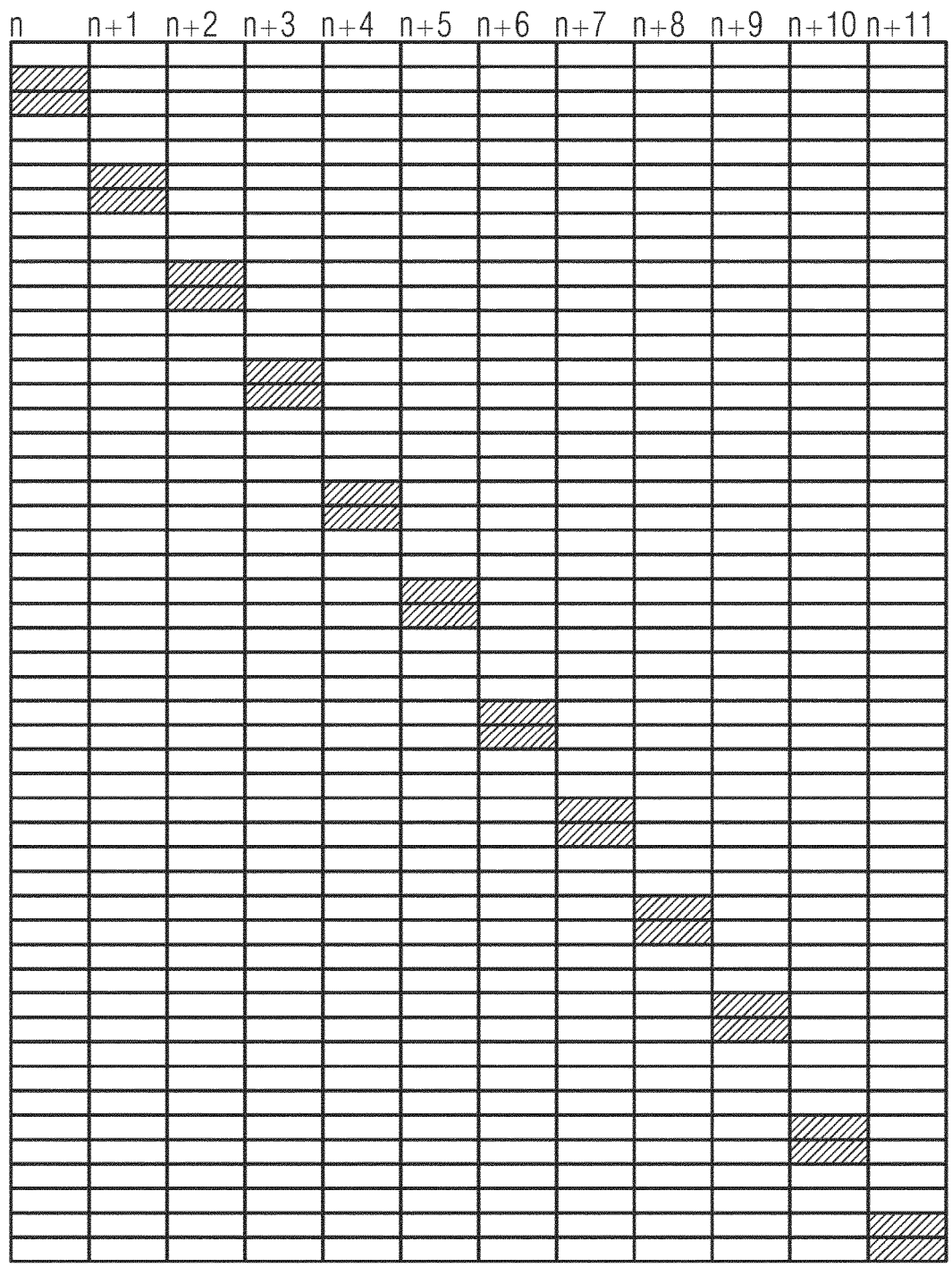
FIG. 8 schematically illustrates PRS locations in subsequent subframes of a transmission scheme according to a third implementation.

This allows the network, e.g. by way of an access network node, to preserve the legacy support to normal wireless communication devices, and enables wireless communication devices with limited RF bandwidth (e.g., <=1.4 MHz for Rel-13 MTC wireless communication device) to improve the performance of positioning such wireless communication devices. Further on, it allows for positioning the wireless communication devices with even smaller RF receiving narrowband e.g. a bandwidth with 2 PRBs as shown in FIG. 8.

Accordingly, a set of PRS narrowbands can be defined for monitoring PRS by wireless communication devices with a limited RF bandwidth. "PRS narrowband" is defined here to differentiate from "data narrowband" that is used for DL transmission of other types of signals and channels. For a wireless communication device, e.g. with a receiving frequency range limitation to 1.4 MHz, the PRS narrowbands are preferably composed of 6 consecutive PRBs and are non-overlapping. The wireless communication device may then (re-)tune or shift its reception frequency range in order to receive PRSs. This shifting may be performed in accordance with a shifting sequence. The shifting sequence may allow the wireless communication device to position its receiving frequency range to correspond to the frequency range within the system bandwidth over which the PRS are transmitted.

Receiving in this context may be understood as completely or partially receiving one or more resource blocks, e.g. one or more resource blocks containing PRS. For example only the part of a resource block containing PRS may be received by the wireless communication device. Also, only a part of the PRS in a resource block may be received by the wireless communication device. The step of receiving may also comprise the step of decoding and/or processing the signals received in the one or more resource blocks.

On the other hand a PRS resource block or a resource block allocated to transmit positioning reference signals (PRS) may be understood to be only the part of an (LTE) resource block containing PRS. However, such a PRS resource block or resource block allocated to transmit positioning reference signals may be understood to only contain part of the PRS present in an (LTE) resource block.

Further a PRS narrowband may contain one or more, that is: a set of, resource blocks. The number of resource blocks then determines the frequency range covered by the PRS narrowband. In the case of the above mentioned Rel-13 wireless communication device there will be six resource blocks. However, a fewer amount of resource blocks may be used for PRS transmission, as shown in FIG. 8.

In one alternative, the set of PRS narrowbands is defined cell-wide. That is, the PRS narrowbands are positioned in a different location within the respective system bandwidth of different cells.

The access network node may transmit PRS in additional subframes dedicated to one or more wireless communication devices having a limited receiving frequency range, i.e. a receiving frequency range being smaller than the system bandwidth. The PRS in such PRS narrowband may not be receivable by legacy wireless communication devices which are not aware of such configuration. The additional subframes may be transmitted and received, respectively, in addition to the legacy PRS, i.e. PRS covering a frequency range centered around the center of the system bandwidth, whereas the PRS of the additional subframes may not be centered but positioned eccentric with regard to the center of the system bandwidth.

Hence, according to an embodiment a first set of resource blocks may be transmitted in a first subframe. The first set of resource blocks may completely cover the system bandwidth. In a second, e.g. subsequent, preferably directly consecutive, subframe a set of resource blocks may be transmitted. This second set of resource blocks may as well as the first set of resource blocks contain PRS, i.e. be allocated to transmit PRS. However, the second set of resource blocks may contain fewer resource blocks than the first set and thus only cover a smaller range of the system bandwidth than the first set of resource blocks. Additionally, the frequency range covered by the second set of resource blocks, i.e. the second frequency range, may be allocated or scheduled in such a manner that it is located in a position of the system bandwidth which corresponds to the one the receiving frequency range of the wireless communication device is located at. Thus the access network node or a control node may be aware of the position the receiving frequency of the wireless communication device is located at and may allocate part of the system bandwidth accordingly for PRS transmission in the second subframe. The position the receiving frequency range of the wireless communication device is located at may be signaled from the wireless communication device and/or may be requested by the access network node or the control node.

Alternatively and/or additionally the wireless communication device may shift its receiving frequency range to a part or a location of the system bandwidth on which a transmission of the second set of resource blocks containing PRS is expected. The position of such a second range could also be signaled by the network node or by the control node. Alternatively a positioning of the second set of resource blocks allocated for transmitting PRS could be requested by the wireless communication device.

In another alternative, the set of PRS narrowbands is wireless communication device-specific, i.e. the wireless communication device may request a certain frequency range on which resource block containing PRS shall be transmitted. Such a request may be based on a measurement of channel state and/or channel quality in a particular frequency range of the system bandwidth. This could be the case where the PRS narrowbands are only used in describing wireless communication device reception, and does not affect access network node transmission. That is, an access network node does not enhance PRS transmission to support wireless communication devices having a relatively small receiving frequency range. For example different parts of system bandwidth could be reserved for transmission of a first or second set of resource blocks corresponding to the receiving frequency range of different types of wireless communication device.

It should be noted that while it is desirable to make the PRS narrowbands coincide with the DL data narrowbands, this is not always necessary. The DL data narrowband grid is defined to support data transmission, whose constraints may not be applicable for PRS reception. Since PRS is transmitted in every PRB of the central $N^{PRS, RB}$ PRBs, the wireless communication device can monitor any number of PRB there within its RF capability, cf. FIG. 4. This is particularly true if the DL data narrowband does not always have 6 PRB, or if there is no data narrowband defined for certain parts of the DL system bandwidth.

Since the PRS (positioning reference signals) shall not be mapped to resource elements with index (k, l) allocated to PBCH, PSS or SSS regardless of their antenna port p, the PRS narrowbands are preferably lined up from the two edges of the system bandwidth. Thus, in one alternative, no PRS narrowband is defined to overlap with REs carrying PSS/SSS/PBCH. This is illustrated in 6. Thus the wireless communication device does not need handle punctured PRS in any PRS narrowbands. This alternative is good for cells with wide system bandwidth, cf. FIGS. 6 and 7.

Figure 9:
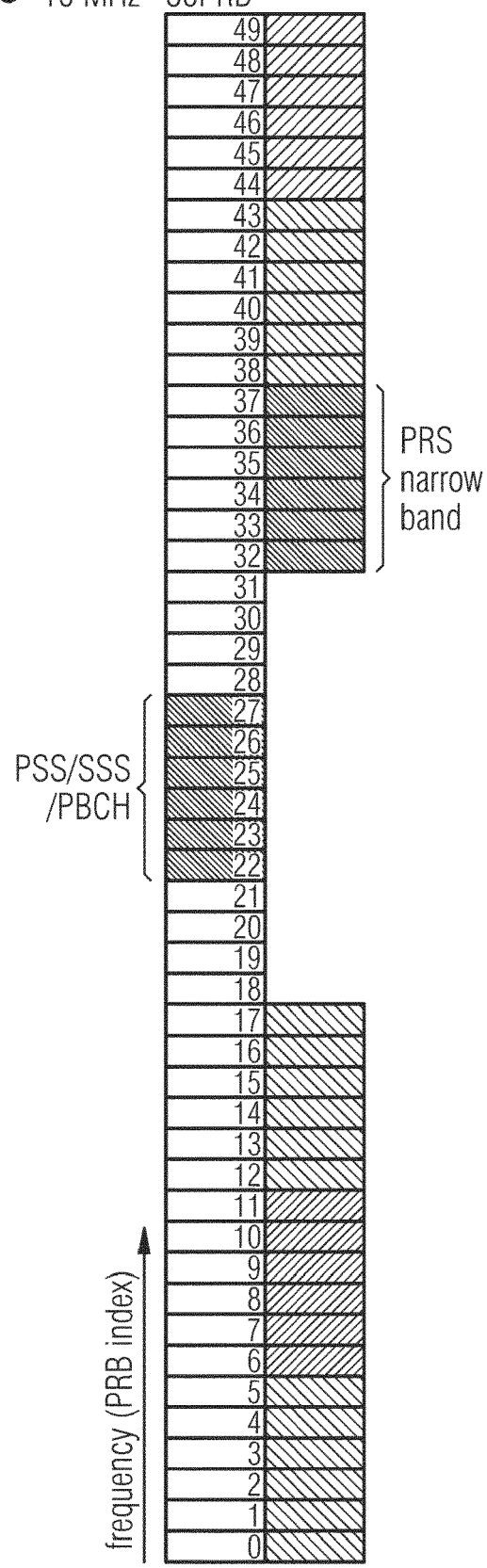
FIG. 9 schematically illustrates PRS locations in a single subframe of a transmission scheme.
Figure 10:
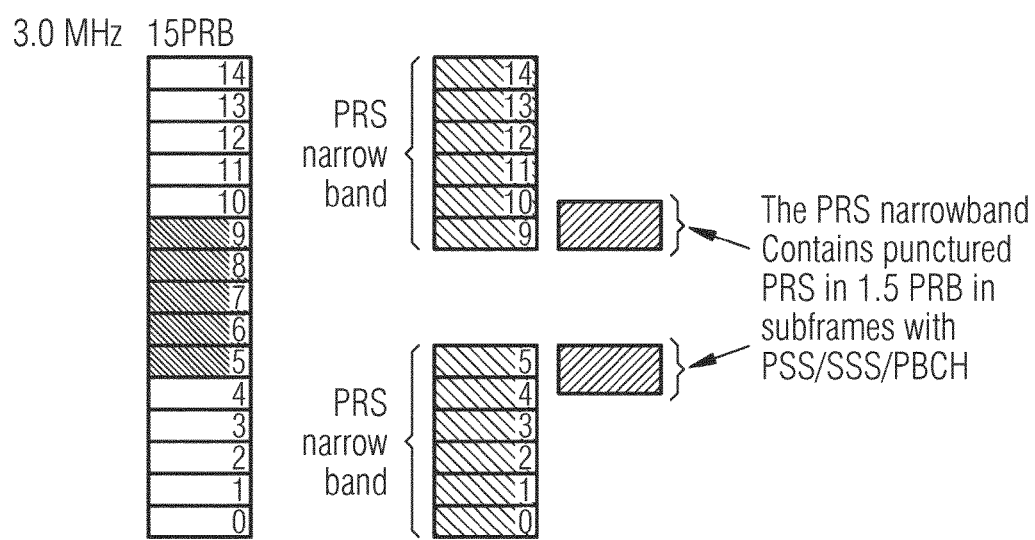
FIG. 10 schematically illustrates PRS locations in scenario with a small system bandwidth.

In another alternative, PRS narrowbands are defined to potentially overlap with REs carrying PSS/SSS/PBCH, cf. FIG. 9. This alternative may be necessary for cells with smaller system bandwidth. In contrast to DL data transmission, there is no issue of transport block failure, thus it is easier for wireless communication device to handle the overlap. For the PRS narrowbands that overlap with PSS/SSS/PBCH frequency range (Primary secondary synchronization/secondary synchronization signals/Physical Broadcast Channel) PRS is receivable over the entire PRS narrowband in subframes that do not contain PSS/SSS/PBCH. In subframes that contain PSS/SSS/PBCH, PRS in REs occupied by PSS/SSS/PBCH are punctured. This needs to be taken this into account by the wireless communication device receiving such a transmission.

Figure 6:
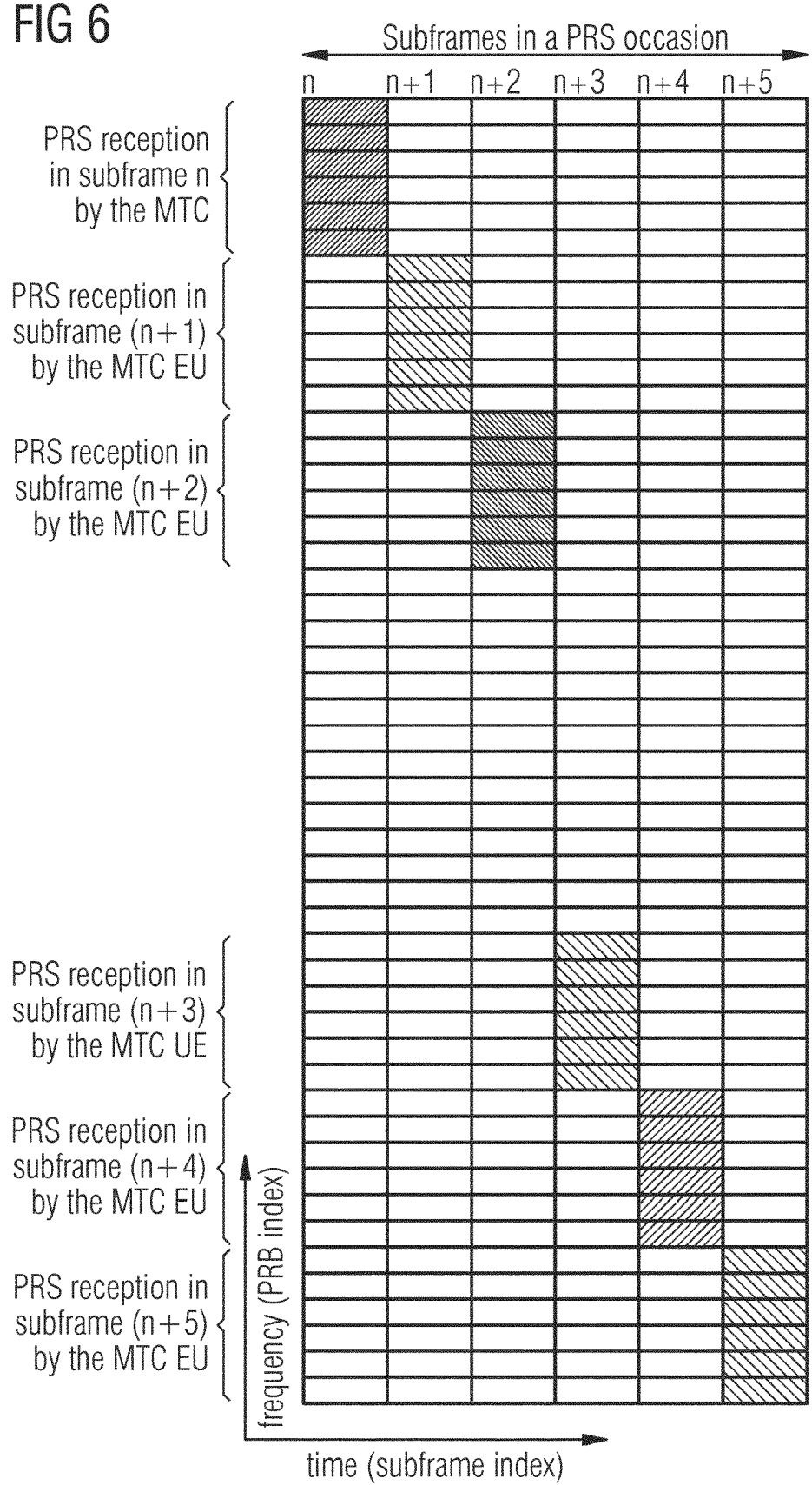
FIG. 6 schematically illustrates PRS locations in subsequent subframes of a transmission scheme according to a first implementation.

Now referring to FIG. 6, a wireless communication device, such as a Rel-13 MTC wireless communication device, may be able to monitor PRS in a PRS occasion, e.g. as described in the above and shown in FIG. 5, by shifting its receiving frequency range.

Thus, the first range of the system bandwidth covered by the first set of resource blocks preferably corresponds to the receiving frequency range of the wireless communication device. The second range of the system bandwidth covered by the second set of resource blocks preferably also corresponds to receiving frequency range of the wireless communication device. The wireless communication device may then be operative to shift its receiving frequency range to at least partially cover the first and/or the second range. In the embodiment according to FIG. 6 the location of the receiving frequency range is shifted from subframe to subframe. The wireless communication device is referred to in FIG. 6 as MTC UE (Machine Type Communication User Equipment). As shown in FIG. 6 the first range and the second range may be adjacent to one another, however transmitted in different subframes. The first set and the second set of resource blocks may though be separated by a frequency gap. Thus the frequency ranges of a first group of sets of resource blocks may be adjacent to one another and be separated by a frequency gap, said frequency gap preferably centered in the middle of the system bandwidth, from a second group of sets of resource blocks also having adjacent frequency ranges.

The wireless communication device may further on be operative to shift the receiving frequency of the wireless communication device to a third range of the system bandwidth allocated to transmit control data and/or payload data transmission. The third range of the system bandwidth does not overlap with the first and or second range of the system bandwidth. Thus control data and/or payload data transmission may be carried out over a different frequency range of the system bandwidth than the transmission/reception of PRS.

The wireless communication device may also be operative to shift the receiving frequency range to a particular range of the system bandwidth on which resource blocks are allocated to transmit positioning reference symbols (PRS). This may be achieved by negotiating such a frequency range with the access network node or a control node.

The wireless communication device may also be operative to transmit an indication indicating a range of the system bandwidth, preferably corresponding to the receiving frequency range, for a set of resource blocks allocated to transmit position reference symbols.

The wireless communication may also be operative to receive an indication indicating a range of the system bandwidth, preferably corresponding to the receiving frequency range ($f^{MTC}$), for a set of resource blocks allocated to transmit position reference symbols.

The indication may comprise or be indicative of a shifting sequence for the receiving frequency range of the wireless communication device. The indication may be signaled explicitly, e.g. by way of a bitmap, or implicitly, e.g. in form of a scrambling sequence, by network node or the control node. As e.g. shown in FIGS. 6 and 8 the shifting sequence may either be (at least partially) stepwise and/or be predefined in another manner affecting the wireless communication device to shift is receiving frequency range. The shifting sequence may however have other patterns according to which the receiving frequency range of the wireless communication device is shifted.

Figure 7:
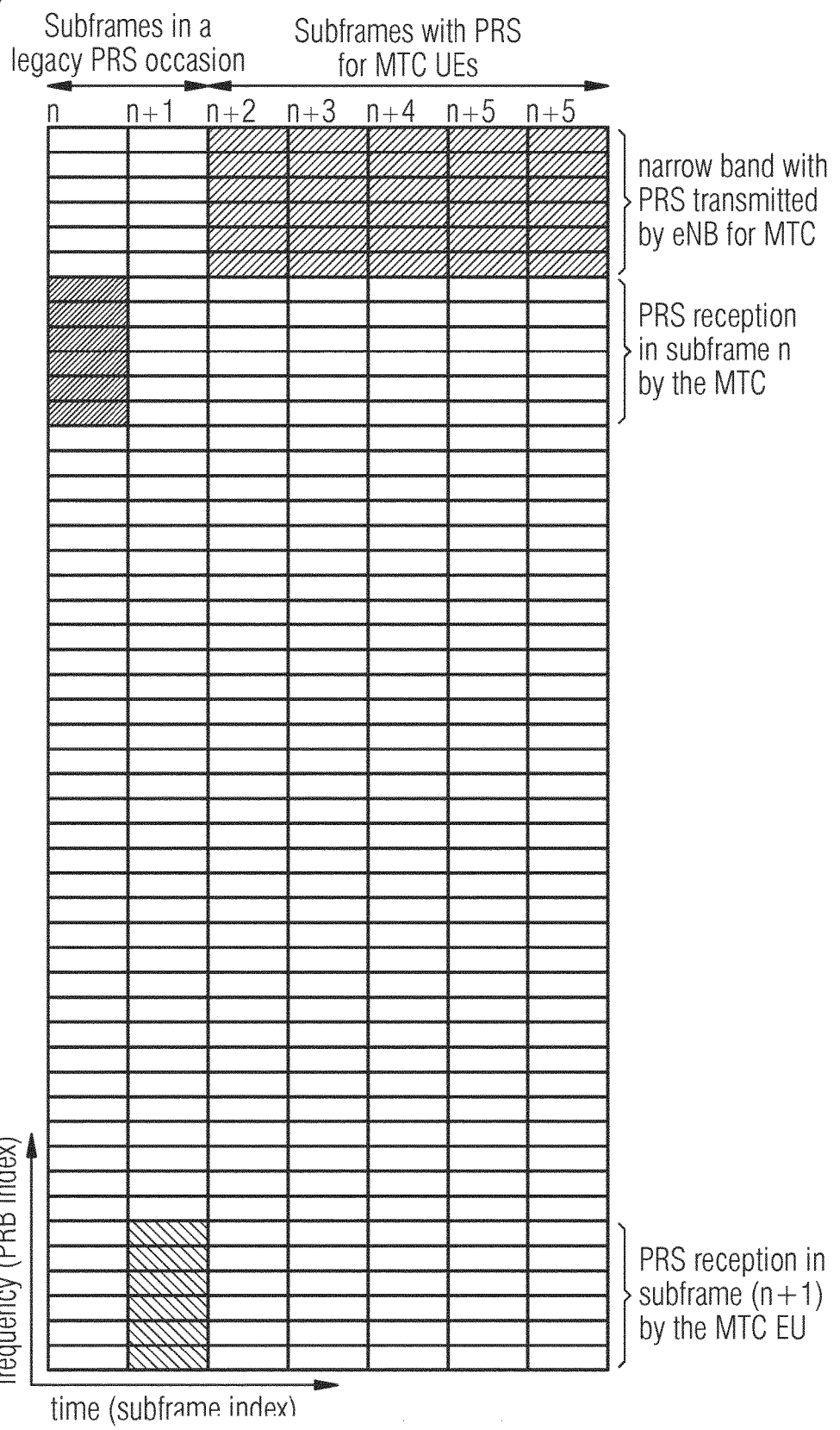
FIG. 7 schematically illustrates PRS locations in subsequent subframes of a transmission scheme according to a second implementation.

By way of example the DL system bandwidth (BW) may be 10 MHz (corresponding to 50 PRBs) and a PRS transmission, e.g. by way of a first set of resource blocks, occupies the entire bandwidth. Across the bandwidth, there may be additional predefined PRS narrowbands, e.g. by way of a second set of resource blocks, spanning for example 6 PRBs each. In time domain, each PRS occasion may be composed of a number of (directly) consecutive subframes, e.g. six consecutive subframes as shown FIG. 11. However, as shown in FIG. 7 the location of resource blocks may change from a first subframe to a second subframe and may thereafter stay at the same position for a consecutive number of subframes.

Figure 11:
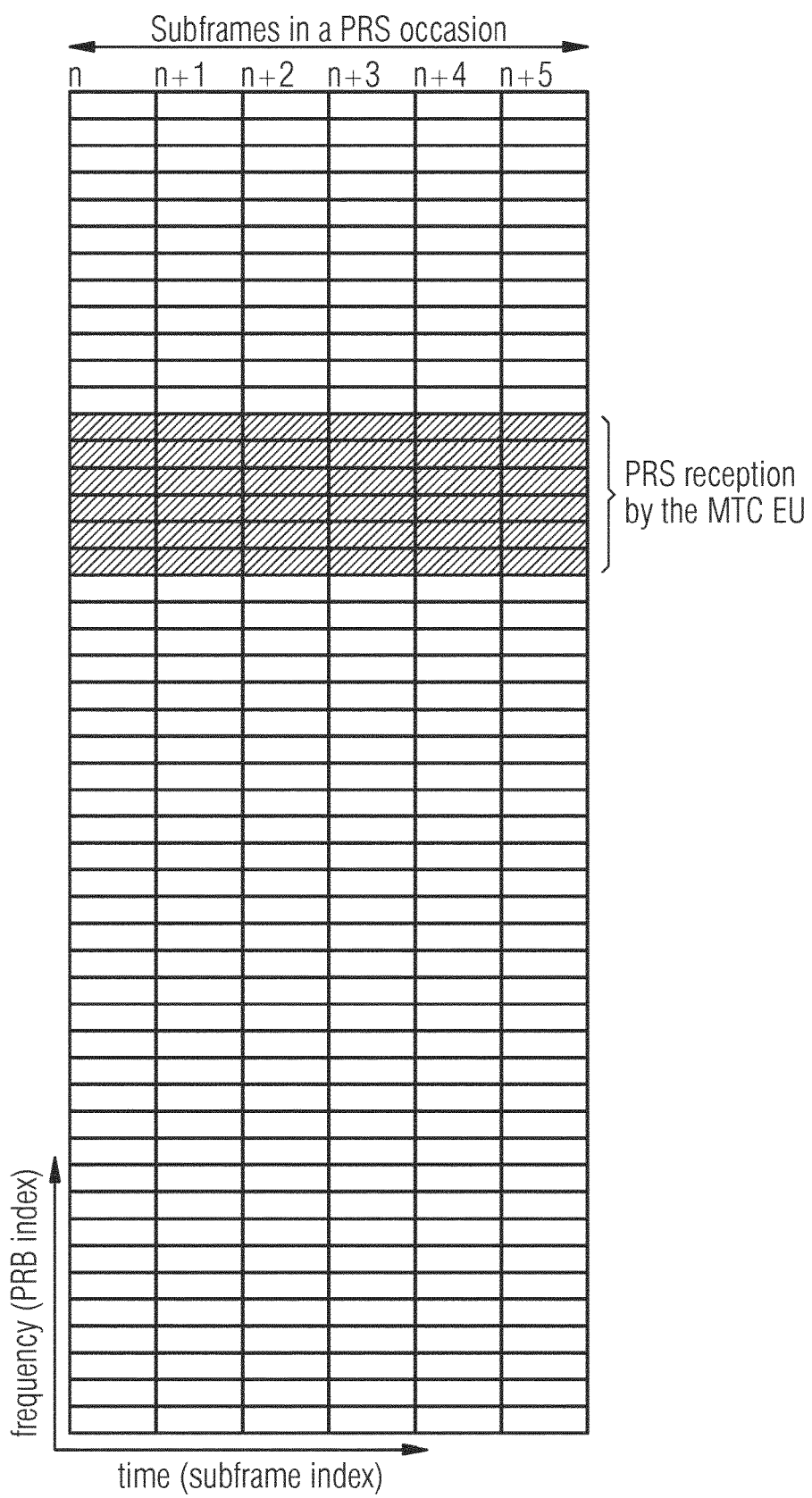
FIG. 11 schematically illustrates PRS locations in subsequent subframes of a transmission scheme.

In one embodiment, as illustrated in FIG. 11, a wireless communication device, e.g. the Rel-13 MTC wireless communication device, may be positioned at a given PRS narrowband in a PRS occasion, without frequency hopping. The PRS narrowband may or may not coincide with a data narrowband used for control and data transmission. In other words, due to the availability of the full or wide PRS bandwidth, the wireless communication device may select the optimal PRS narrowband to carry out TOA (Time Of Arrival) measurements required by the RSTD calculation.

In another embodiment, as illustrated in FIGS. 6 and 8 for example, the wireless communication device shifts (its receiving frequency range) to a different PRS narrowband from subframe to subframe when monitoring the PRS in an occasion, in order to obtain frequency diversity across subframes. As shown in FIG. 8 the resource blocks allocated for transmitting PRS may be separated from subframe to subframe by a constant frequency gap.

In a further embodiment, in each subframe, the PRS narrowband that the wireless communication device shifts to or retunes to is selected randomly. Such a frequency hopping can be realized by a pseudo-random sequence. In this embodiment the PRS signal is preferably transmitted from the access network node via the entire system bandwidth. However, it is possible to randomly shift the receiving frequency range of the wireless communication device only in a (contiguous) part of the system bandwidth.

In one alternative, the PRS narrowbands are available with subcarrier-granularity and two PRS narrowband can overlap. The starting subcarrier index of the measured PRS narrowband is determined by a random number generator distributed in the range of 0 to m−7, where m is the total number of the subcarriers available for PRS. The starting subcarrier index can hop to a new value in every PRS subframe and in every positioning occasion.

In another alternative, the PRS narrowbands are available with 6-PRB-granularity and two PRS narrowbands do not overlap, as e.g. shown FIG. 6. The PRB narrowband index of the monitored PRS narrowband is determined by a random number generator. The PRB narrowband index may hop to a new value in every PRS subframe and in every positioning occasion.

In another embodiment, the hopping of PRS narrowband is decided in a deterministic way, as a function of a subset of the parameters such as cell ID, subframe index, etc. For example, one way to calculate the starting subcarrier index could be implemented as $$n_s = (N_{ID}^{Cell} + n_{sf} \cdot \Delta_{offset}) \bmod (m-7)$$

where $n_{sf}$ is the subframe index and $\Delta_{offset}$ is selected such that the cross-subframe PRS narrowbands could be distributed as evenly as possible across the available bandwidth. The hopping or shifting sequence and the corresponding pattern may be used for transmission by the access network node and for reception by the wireless communication device.

Thus, the frequency range of the set of resource blocks allocated for transmitting PRS may be dynamically shifted based on the subframe index. Accordingly the receiving frequency range of the wireless communication device may be shifted based on the subframe index.

In the embodiments discussed above, power boosting may be applied to the PRS transmissions in the PRS narrowbands occupied by wireless communication devices for improved performance.

Now turning rather to the point of view of the access network node and the control node, additional PRS can be sent in time by an access network node of the network, e.g. an eNB. The access network node transmits additional PRS dedicated to wireless communication device in subframes, e.g. in subframes that normally do not contain PRS. Since the wireless communication device is only capable of receiving a limited number of resource block, e.g. 6 PRB, in one embodiment the access network node only transmits such additional PRS in a single PRS narrowband of a corresponding number of resource blocks in a subframe. This allows the rest of the bandwidth to be used for any other signal or channel. Due to the reduced bandwidth for a PRS narrowband, power boosting may be applied to PRS resource elements. In one embodiment, as illustrated in FIG. 7, in the first n_1 subframes, i.e. the first two subframes m, n−1 in FIG. 7, the access network node transmits PRS across the entire system bandwidth or a part of the system bandwidth centered around the center frequency of the system bandwidth (however only the part received by the wireless communication device is shown), and in the rest of n_e subframes, i.e. the subframes n+2, . . . , n+5 in FIG. 7, the access network node transmits PRS in a PRS narrowband. Such as scenario may be referred to as an extended PRS occasion. It is assumed that the maximum total number of subframes containing legacy PRS (centered around the center of the system bandwidth) and/or the PRS specific to wireless communication device (covering a first and/or a second range by way of a first and/or second set of resource blcoks) in one occasion is limited, e.g. to six. That is, n_1+n_e<=6, such that no more number of subframes would be required for PRS processing than what is specified in current standard.

In a further embodiment, necessary signaling information, including configuration of the PRS specific to wireless communication devices, the location of the selected PRS narrowband, etc., can be carried between access network node and E-SMLC via the LPPa protocol, and shared between the E-SMLC and the wireless communication device via the LPP protocol. The transmission of PRS specific to wireless communication devices and the related signaling are transparent to the legacy wireless communication devices.

In a further embodiment, the maximum total number of subframes containing legacy PRS and/or the specific PRS in one occasion is not limited to six. That is, n_1+n_e>6 and the number of legacy PRS and/or the PRS narrowband can be configured on an access network node and/or control node specific basis or may be negotiated between the wireless communication device and the access network node and/or the control node.

In another embodiment, the access network node transmits PRS in the different PRS narrowbands across subframes for wireless communication device in an extended PRS occasion. The location of the different PRS narrowbands may follow a predefined cell-wide DL frequency hopping pattern. Several embodiments for the frequency hopping/shifting (patterns) have already been discussed in the above. The frequency hopping pattern can be exchanged between a network node, such as an access network node and/or a control node, such as an E-SMLC via the LPPa protocol, and between the control node, i.e. an E-SMLC, and wireless communication device, e.g. the Rel-13 MTC wireless communication device, via the LPP protocol.

In another embodiment, the access network node transmits PRS in the same PRS narrowband for wireless communication device in an extended PRS occasion, but the location of the PRS narrowband varies between PRS occasions according to a frequency hopping pattern, i.e. a shifting sequence. The frequency hopping pattern can be shared between access network node and E-SMLC via the LPPa protocol, and shared between the E-SMLC and the wireless communication device via the LPP protocol, e.g. according to the embodiment as shown in FIG. 1.

In order to mitigate inter-cell interference the wireless communication device, e.g. a Rel-13 MTC wireless communication device, may need to measure the PRS from 5-6 neighbor cells to calculate the RSTD. Due to the RF limitation of 1.4 MHz, the Rel-13 MTC wireless communication device can only measure a PRS narrowband and hence, the hearability is threatened by inter-cell interference. Such problem escalates in the case of MTC-specific PRS transmission, in which other types of signals are transmitted on the bandwidth other than the PRS narrowband.

To handle inter-cell interference, the time-frequency resource of PRS narrowband transmission may be coordinated between neighbor cells, including:

Frequency-domain. Coordinate PRS narrowband pattern to avoid interference between PRS sent by neighbor access network nodes or neighbor cells. For example, if one access network node is expected not to be part of RSTD measurement, it shall not transmit specific PRS on the PRS narrowband that is assigned to a target wireless communication device.

Time-domain. Coordinate muting pattern of PRS occasion to avoid interference between specific PRS sent by neighbor access network nodes. In one alternative, the muting pattern of the specific PRS follows that of the regular PRS, i.e. occurring at the same time. In another alternative, the muting pattern of the specific PRS operates independently. For example, due to higher sensitivity to inter-cell interference, muting of specific PRS occurs more frequently than the regular PRS.

Between PRS and other signal/channel. Avoid sending control and data in time-frequency resources in an access network node that interfere with specific PRS of a neighbor cell. For example, when a PRS narrowband pattern is given, no control or data signal from other access network nodes shall be transmitted on the patterned PRS narrowbands.

To enable the above coordination between neighboring access network nodes or cells, proper signaling for specific PRS configuration is necessary. The interactions between the location server, as an exemplary embodiment of a control server, and the eNodeB, as an exemplary embodiment of a access network node, are via the LPPa protocol. As shown in FIG. 12 necessary signaling fields (underlined) have been added to the OTDOA Cell Information IE.

The field MTC-specific PRS Bandwidth indicates the bandwidth of the PRS narrowband by selecting from BW1 to BW 6, i.e. bandwidth with 1PRB to 6PRBs.

The field MTC-specific PRS pattern indicates the PRB indices (frequency domain) and the subframe indices (time domain) that the MTC-specific PRS is transmitted on. This field may comprise two parts: the first part is a mapping table that can be similar to that of the existing field PRS Configuration Index (cf. TS 36.211).

An example of such a mapping table is shown in FIG. 13, where Δ can be the subframe offset with respect to the regular PRS subframes. The index $I_{PRS}$ is used to indicate the time-domain arrangement of the (MTC-specific) PRS pattern (shifting sequence). Alternatively, only the offset value is indicated in this field. The second part is a vector of values that indicates, for each subframe, the starting PRB index of the PRS narrowband, i.e. its position in the bandwidth.

A new field, Number of (MTC-specific) frames, indicates the number of consecutive (MTC-specific) PRS subframes in one occasion. At the end of the table, the field (MTC-specific) PRS Muting Configuration indicates the muting pattern of the (MTC-specific) PRS subframes.

Figure 14:
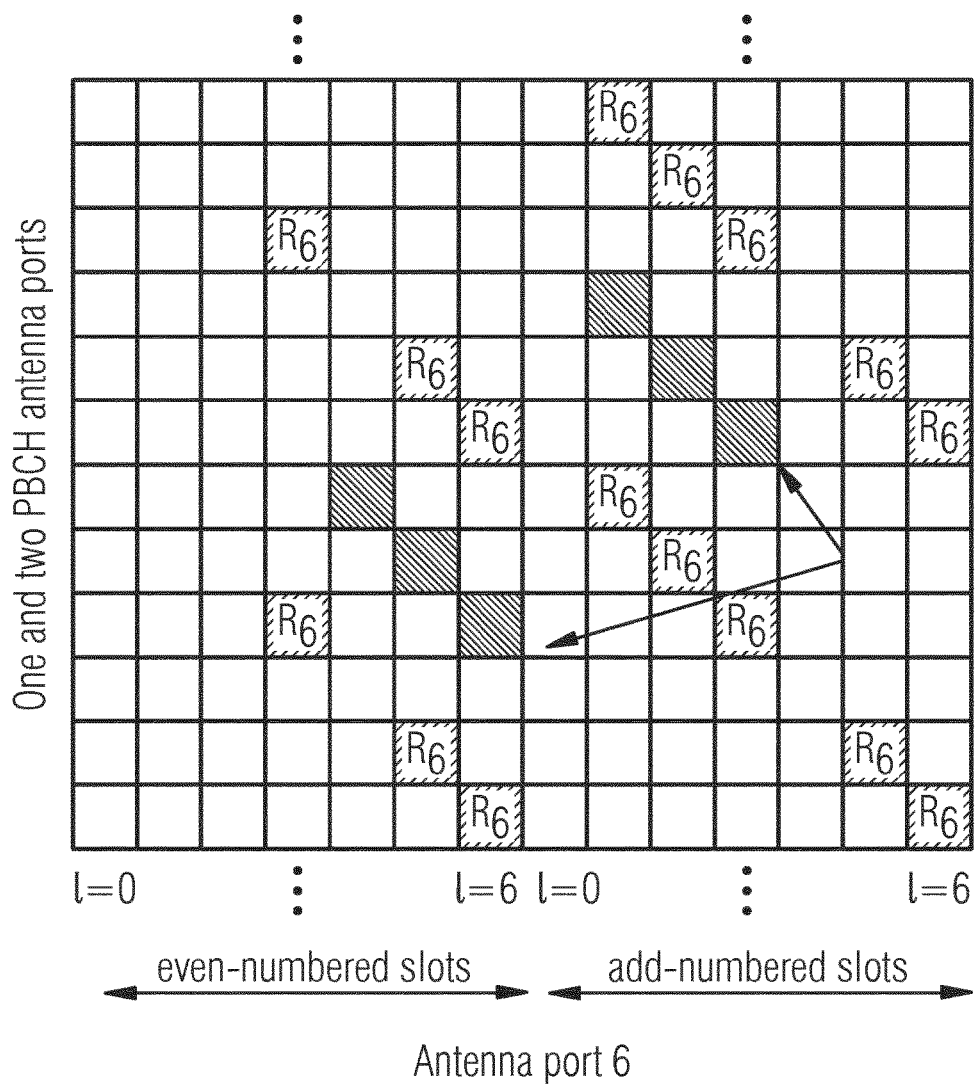
FIG. 14 schematically illustrates a resource block with additional PRS.

Now referring to FIG. 14, a resource block with increased PRS density within a PRS subframe is illustrated. The number of PRS symbols within a PRS subframe may be increased to improve positioning performance for a wireless communication device with a limited receiving frequency range. The additional PRS, indicated by the arrows in FIG. 14, may be configured for transmission within one or more PRS narrowbands. These additional PRS symbols may be obtained by copying the PRS symbols corresponding to the PRS sequence used by the access network node, e.g. in a particular cell. Neighboring access network node or cells that transmit PRS on the same PRS narrowband may also use the same configuration for additional PRS symbols, which may be achieved by inter-cell coordination.

Figure 15:
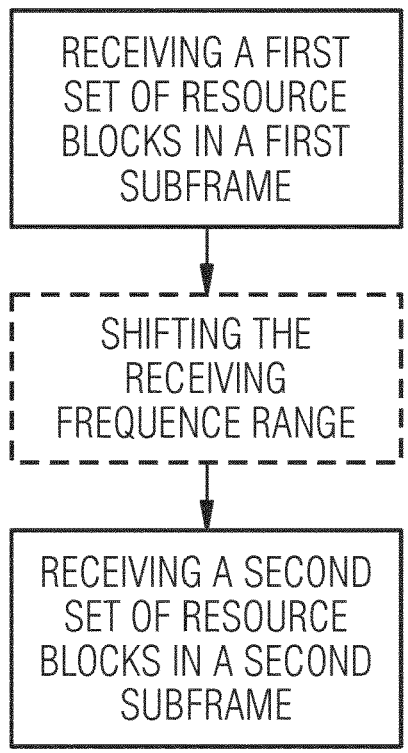
FIG. 15 shows a flow chart illustration of a first implementation with regard to a wireless communication device.

Now referring to FIG. 15 the method for operating a wireless communication device comprising the step of: Receiving resource blocks (N) in a shiftable receiving frequency range ($f^{MTC}$) within a system bandwidth ($N^{RB}$) for transmission of resource blocks (N) allocated to transmit positioning reference signals (PRS), the receiving frequency range ($f^{MTC}$) being smaller than the system bandwidth ($N^{RB}$) is described.

As already described, receiving resource blocks may be understood as only partially receiving a part of a resource block containing PRS. This may be due to a guard interval when shifting the receiving frequency range of the wireless communication device.

Such a wireless communication device may for example be a user equipment (UE), a mobile phone, a smartphone, a data modem, a mobile computer, or another kind of terminal device such as a sensor being equipped with a wireless interface or even a vehicle equipped accordingly.

Reference is hereby also made to US Patent Application Publication US 2010/0271965 A1 titled "Methods and Apparatus In A Wireless Communication System" which is hereby incorporated by reference.

The receiving frequency range of the wireless communication device may primarily be limited through the hardware employed. Thus the capability of the wireless communication device with regard to the receiving frequency range is limited. The receiving frequency range may hence be even smaller than the first and/or second (frequency) range of the first and/or second set of resource blocks, respectively.

Preferably the receiving frequency range however correspond to the first and or second frequency range covered by the first and/or second set of resource blocks.

Since the wireless communication device has only such a small receiving frequency range it may not be aware of the fading and/or interference conditions throughout the entire system bandwidth. Also, scanning the entire bandwidth would be time consuming since it would require the wireless communication device to shift and detect the channel condition over a frequency range having a bandwidth of a multiple of the receiving frequency bandwidth. Thus it is advantageous to either transmit PRS in a PRS narrowband and/or to allow the wireless communication device to shift frequency in between to subsequent transmissions of PRS. The transmission of the resource blocks mentioned are al performed by one access network node or in one cell. That is to say, the frequency range over which the PRS are transmitted within a cell may change.

Transmission scheme may be understood as the time-frequency structure of a wireless communication between a sender and a receiver such as an access network node and a wireless communication device. In LTE the transmission scheme for example comprises a radio frame defined as a block of 10 ms which is divided in 10 subframes. One sub-frame includes two slots. Subframes again comprises resource blocks which themselves comprise resource elements.

The method may further comprise: Receiving in a first subframe of a transmission scheme applied by an access network node a first set of resource blocks ($N^{PRS}$) allocated to transmit positioning reference signals (PRS), said first set of resource blocks corresponding to a first range of the system bandwidth ($N^{RB}$).

The first range may correspond to the receiving frequency range of the wireless communication device. The first range may consist of (contiguous) resource blocks. The first range may thus cover the same part of the system bandwidth which is covered by the receiving frequency range of the wireless communication device. The receiving frequency range of the wireless communication device may be shifted in the first place to cover the range of the system bandwidth over which the first set of resource blocks is transmitted from the access network node.

The method may further comprise: Shifting the receiving frequency range from at least partially covering the first range to at least partially covering a second range. This shifting may take place after receiving the first set of resource blocks.

Receiving in a subsequent, second subframe of said transmission scheme applied by said access network node a second set of resource blocks ($N^{PRS}$) allocated to transmit positioning reference signals (PRS), said second set of resource blocks corresponding to said second range of the system bandwidth ($N^{RB}$).

Although the shifting of the receiving frequency range is preferably completed before receiving the second set of resource blocks the situation may occur that only part of the second set of resource blocks is received by the wireless communication device due to the time it takes for shifting the receiving frequency range—however this should also be understood as receiving a (set of) resource block.

Also, as stated in the above already the step of receiving may comprise the step of decoding and or further processing the PRS transmitted by the access network node.

The shifting may be performed according to a shifting sequence which is stored in the wireless communication device. This shifting sequence may determine the frequency range within the system bandwidth the receiving frequency range is shifted to. The shifting sequence may be determined by the wireless communication device or may be received from the access network node or the control node. As explained earlier, a few resource elements of a resource block may be lost to the guard interval in case of frequency shifting of the wireless communication device. However, in LTE the PRS symbols do not occupy the first three OFDM symbols within a subframe. Thus a resource block may be defined as containing a certain number of PRS.

Figure 16:
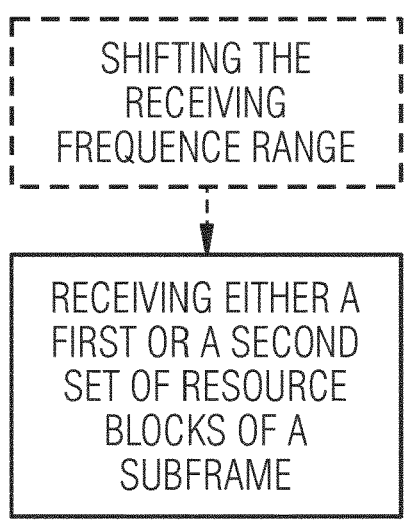
FIG. 16 shows a flow chart illustration of a second implementation with regard to a wireless communication device.

Now referring to FIG. 16 the method for operating a wireless communication device may comprise: Shifting the receiving frequency range to at least partially cover either a first or a second range of the system bandwidth. This may take place prior to receiving a first and/or second set of resource blocks. The shifting may be done in accordance with a shifting sequence which determines to which frequency the receiving frequency range of the wireless communication device is shifted to.

Subsequently the wireless communication device may receive in a subframe of said transmission scheme applied by said access network node a first set of resource blocks ($N^{PRS}$) allocated to transmit positioning reference signals (PRS), said first set of resource blocks corresponding to a first range of the system bandwidth ($N^{RB}$), or Receiving in said subframe of said access network node a second set of resource blocks ($N^{PRS}$) allocated to transmit positioning reference signals (PRS), said second set of resource blocks corresponding to a second range of the system bandwidth ($N^{RB}$).

Thus since the first and the second set of resource blocks are transmitted simultaneously from the access network node, preferably in different non-overlapping parts of the system bandwidth, as e.g. illustrated in FIG. 9, the wireless communication device may be configured to receive a dedicated frequency range for receiving PRS. Alternatively the wireless communication device may take into account the different conditions, e.g. fading or interference, in order to choose the first or the second range for receiving the PRS.

Figure 17:
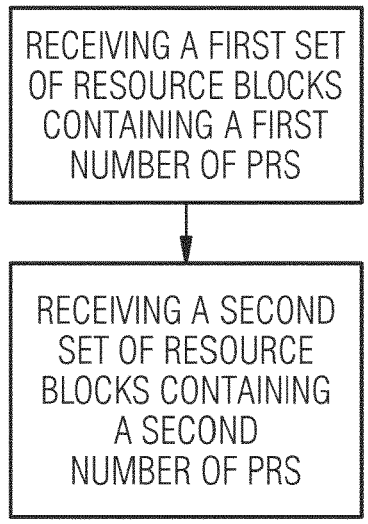
FIG. 17 shows a flow chart illustration of a third implementation with regard to a wireless communication device.

Now referring to FIG. 17 the method for operating the wireless communication device may comprise the steps of: Receiving a first set of resource blocks ($N^{PRS}$) allocated to transmit positioning reference signals (PRS), and Receiving a second set of resource blocks ($N^{PRS}$) allocated to transmit positioning reference signals (PRS), and wherein the first and the second set of resource blocks contain a different number of positioning reference signals (PRS).

A resource block with a higher number PRS, i.e. containing additional PRS, is illustrated in FIG. 14.

The method may further comprise receiving a different number of PRS in different resource blocks of the same subframe of said transmission scheme applied by said access network node.

The method may further comprise the step of: Receiving a different number of PRS in resource blocks of subsequent subframes of said transmission scheme applied by said access network node.

Thus either a first range of the system bandwidth may comprise said first set of resource blocks and a second range may comprise said second set of resource blocks, the first and the second set of resource blocks being transmitted simultaneously or the first set may be transmitted at a different point in time than the second set of resource blocks. This will allow the wireless communication device to shift its receiving frequency range to a range of the system bandwidth in which the denser resource blocks, the one containing additional PRs are located.

The methods and the method steps according to any one of the embodiments as described in accordance with the FIGS. 15 to 17 may be combined.

It should be noted that the method steps as described in the above are completely or at least partially carried out by the wireless communication device.

Figure 18:
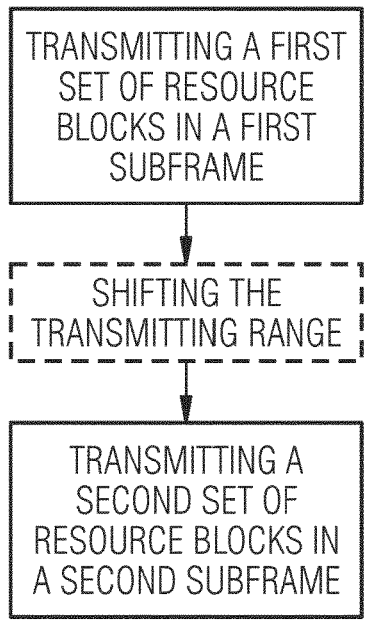
FIG. 18 shows a flow chart illustration of a first implementation with regard to an access network node.

Now referring to FIG. 18 the method for operating a access network node may comprise the step of: Transmitting resource blocks in a receiving frequency range ($f^{MTC}$) of a wireless communication device within a system bandwidth ($N^{RB}$) for transmission of resource blocks, the receiving frequency range ($f^{MTC}$) of the wireless communication being smaller than the system bandwidth.

The method may further comprise: Transmitting in a first subframe of a transmission scheme a first set of resource blocks ($N^{PRS}$) allocated to transmit positioning reference signals (PRS), said first set of resource blocks corresponding to a first range of the system bandwidth ($N^{RB}$), and Transmitting in a subsequent, second subframe of said transmission scheme a second set of resource blocks ($N^{PRS}$) allocated to transmit positioning reference signals (PRS), said second set of resource blocks corresponding to a second range of the system bandwidth ($N^{RB}$).

The access network node may in general employ a transmission scheme for communicating with one or more wireless devices in its coverage area. In between transmitting the first and the second set of resource blocks the access network node may also be required to shift its transmitting range. As already described this can be done in accordance with a predetermined shifting sequence corresponding to the one the wireless communication device shifts its receiving frequency range. Thus coordination between the shifting of the transmission range, i.e. the transmission of the first and second resource blocks, and the shifting of receiving frequency range may be achieved, e.g. by communicating said shifting sequence between the access network node and the wireless communication device. The shifting of the first and second range (from one subframe to another) is for example illustrated in FIGS. 5, 6, 7 and 8.

Figure 19:
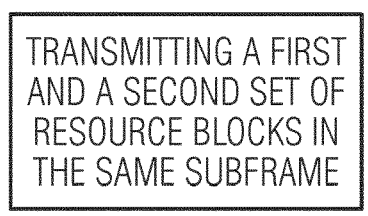
FIG. 19 shows a flow chart illustration of a second implementation with regard to an access network node.

Now referring to FIG. 19 the method for operating an access node may comprise the step of: Transmitting in a subframe of a transmission scheme a first set of resource blocks (NPRS) allocated to transmit positioning reference signals (PRS), said first set of resource blocks corresponding to a first range of the system bandwidth (NRB), and Transmitting in said subframe of said transmission scheme a second set of resource blocks (NPRS) allocated to transmit positioning reference signals (PRS), said second set of resource bocks corresponding to a second range of the system bandwidth (NRB). The parallel transmission of multiple sets of resource blocks is depicted in FIG. 9.

Each set of resource blocks may cover the same or different frequency ranges within the system bandwidth. Thus a grid made of building blocks corresponding to a set of resource blocks may be provided for. Different wireless communication devices can then be able to listen to a certain part of that grid. This grid can be combined with the embodiments as described in connection to the preceding figures. E.g. the resource block can be repeated for a predetermined number of subframes.

Figure 20:
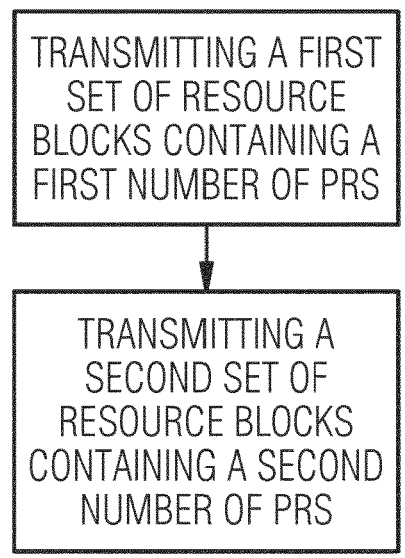
FIG. 20 shows a flow chart illustration of a third implementation with regard to an access network node.

Now referring to FIG. 20 the method for operating a access network node may comprise: Transmitting a first set of resource blocks (NPRS) allocated to transmit positioning reference signals (PRS), Transmitting a second set of resource blocks (NPRS) allocated to transmit positioning reference signals (PRS), wherein the first and the second set of resource blocks contain a different number of positioning reference signals (PRS). This embodiment can be combined with the previous embodiments described in connection with FIGS. 15 to 19, i.e. the denser, second set of resource blocks may be transmitted in another range of the system bandwidth than the less dense, first set of resource blocks, e.g. in the same subframe, or may be transmitted in another subframe, e.g. in the same range of the system bandwidth.

It should be noted that the above-mentioned method steps are carried out by the access network node. Thus, an access node may be provided which is operative to perform any one of the methods and/or method steps as described in connection with the embodiments described with regard to the FIGS. 1 to 23.

Figure 21:
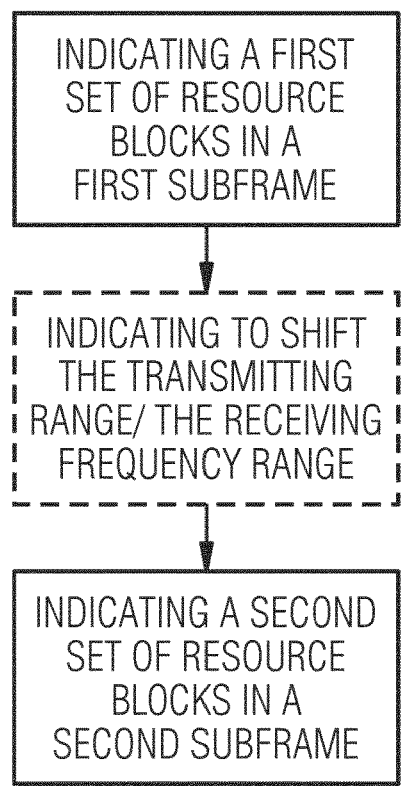
FIG. 21 shows a flow chart illustration of a first implementation with regard to a control node.

Now referring to FIG. 21 the method for operating a control node for controlling transmission of resource blocks allocated to transmit positioning reference symbols (PRS), comprising the step of: Indicating resource blocks (N) in a receiving frequency range of a wireless communication device within a system bandwidth for transmission of resource blocks, the receiving frequency range being smaller than the system bandwidth.\

The control node may very well be an above described SLMC. However the control node may be part of an access network node such as an eNB or even of the wireless communication device.

The method for operating the control node may further comprise: Indicating a first set of resource blocks (NPRS) allocated to transmit positioning reference signals (PRS) in a first subframe of a transmission scheme applied by an access network node, said first set of resource blocks corresponding to a first range of the system bandwidth ($N^{RB}$), and Indicating a second set of resource blocks ($N^{PRS}$) allocated to transmit positioning reference signals (PRS) in a subsequent, second subframe of said transmission scheme applied by said access network node, said second set of resource blocks corresponding to a second range of the system bandwidth ($N^{RB}$).

Optionally the control node may indicate to the access network node and/or the wireless communication device to shift the transmission range and the receiving frequency range respectively. As this step may be carried out between the indication of the first and the second set of resource blocks the step of indicating to shift the transmitting range and/or the receiving frequency range may be carried out in advance of indicating the first set of resource blocks. The indicating of the first and the second set of resource blocks or the indicating to shift can be performed by way of an information table as shown in FIGS. 12 and 13. As such the indicating steps may be performed more or less simultaneously.

Thus, now referring to FIG. 22, the method for operating the control node may comprise: Indicating to the wireless communication device to shift of the receiving frequency range of from at least partially covering the first range to at least partially covering the second range.

Now referring to FIG. 23, the method for operating the control node may further comprise: Indicating a first set of resource blocks ($N^{PRS}$) allocated to transmit positioning reference signals (PRS) in a subframe of said transmission scheme applied by said access network node, said first set of resource blocks corresponding to a first range of the system bandwidth ($N^{RB}$), and Indicating a second set of resource blocks ($N^{PRS}$) allocated to transmit positioning reference signals (PRS) in said subframe of said transmission scheme applied by said access network node said second set of resource blocks corresponding to a second range of the system bandwidth ($N^{RB}$).

Thus by way of indicating the control node is able to set the transmitting range and/or the receiving frequency range for transmission and or receiving of the PRS.

Thus, a control node may be provided which is operative to perform any of the above-mentioned method steps.

Figure 24:
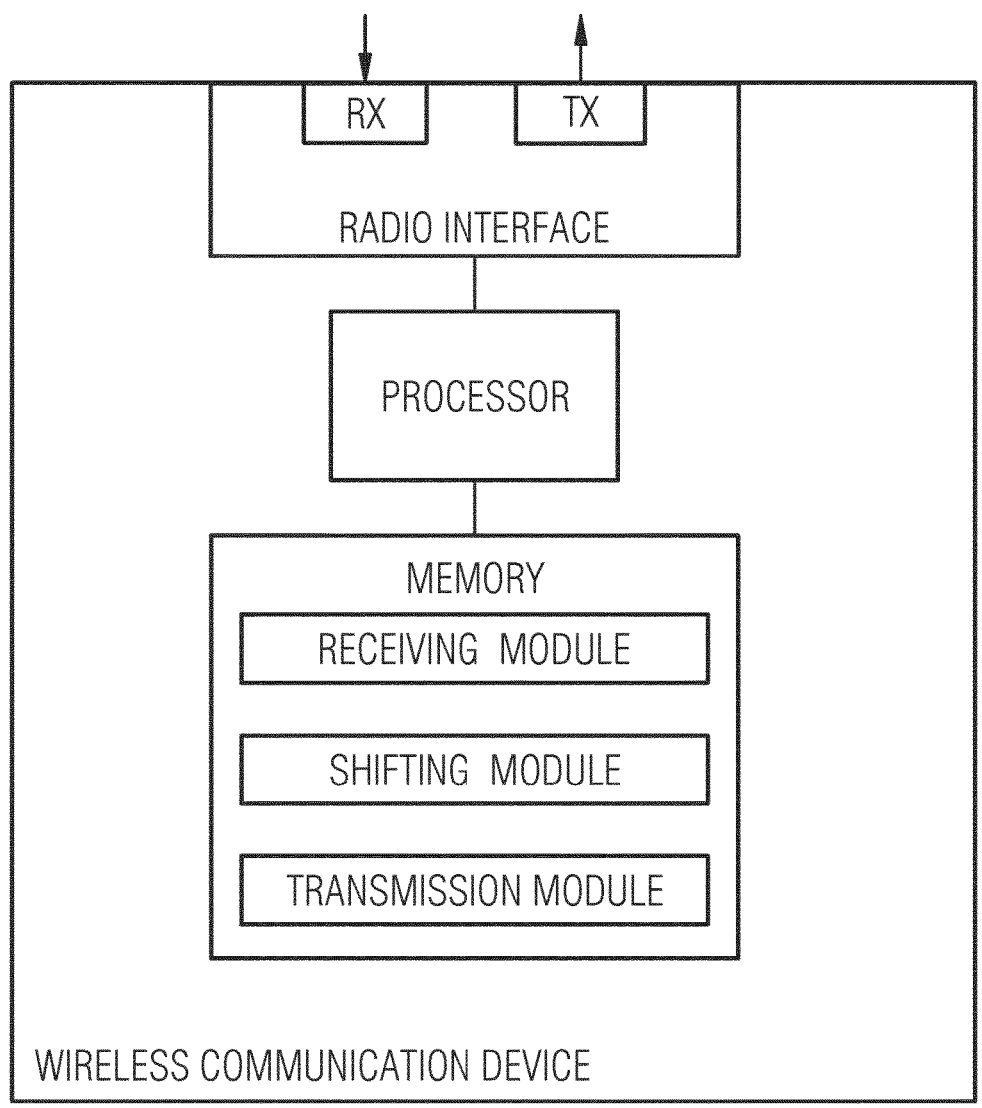
FIG. 24 schematically illustrates exemplary structures of a wireless communication device.

Now referring to FIG. 24, exemplary structures for implementing the above-described concepts in the wireless communication device are schematically illustrated.

In the illustrated structure, the wireless communication device includes a radio interface for performing data transmission to or from the wireless communication device via a first (radio) link. It is to be understood that for implementing transmitter (TX) functionalities the radio interface includes one or more transmitters, and that for implementing receiver functionalities (RX) functionalities the radio interface may include one or more receivers. In the above-mentioned LTE scenario, the radio interface may correspond to the Uu interface of the Evolved Universal Terrestrial Radio Access Network (E-UTRAN). The interface may enable wireless and/or wired transmission.

Further, the wireless communication device includes a processor coupled to the radio interface and a memory coupled to the processor. The memory may include a ROM, e.g., a flash ROM, a RAM, e.g., a DRAM or SRAM, a mass storage, e.g., a hard disk or solid state disk, or the like. The memory includes suitably configured program code to be executed by the processor so as to implement the above-described functionalities of the access network node. More specifically, the memory may include a module for accomplishing provision of: Receiving in a first subframe of a transmission scheme applied by an access network node a first set of resource blocks (NPRS) allocated to transmit positioning reference signals (PRS), said first set of resource blocks corresponding to a first range of the system bandwidth (NRB). Said module may also accomplish the provision of: Receiving in a subsequent, second subframe of said transmission scheme applied by said access network node a second set of resource blocks (NPRS) allocated to transmit positioning reference signals (PRS), said second set of resource blocks corresponding to said second range of the system bandwidth (NRB). Additionally said module may accomplish the provision of: Receiving and/or Transmitting above described indication indicating a range of the system bandwidth, an antenna port. The wireless communication device may comprise a transmission module for that purpose as well.

Further, the memory may also include a shifting module for shifting the receiving frequency range from at least partially covering the first range to at least partially covering a second range.

It is to be understood that the structure as illustrated in FIG. 24 is merely schematic and that the first node may actually include further components which, for the sake of clarity, have not been illustrated, e.g., further interfaces or additional processors. Also, it is to be understood that the memory may include further types of program code modules, which have not been illustrated. For example, the memory may include program code modules for implementing typical functionalities of a wireless communication device or program code of one or more applications to be executed by the processor. According to some embodiments, also a computer program product may be provided for implementing concepts according to embodiments disclosed herein, e.g., a computer-readable medium storing the program code and/or other data to be stored in the memory.

The wireless communication device may thus comprise one or modules for carrying out the embodiments as described with regards to FIGS. 1-23. Hence, a wireless communication device may be provided which is operative to perform any of the method steps as described in accordance with the embodiments of the FIGS. 1 to 23.

The at least one processor of the wireless communication device is operative to receive, via the interface, the first and/or second set of resource blocks and/or to shift the receiving frequency range and/or to transmit the any one of the indications mentioned in the embodiments.

Figure 25:
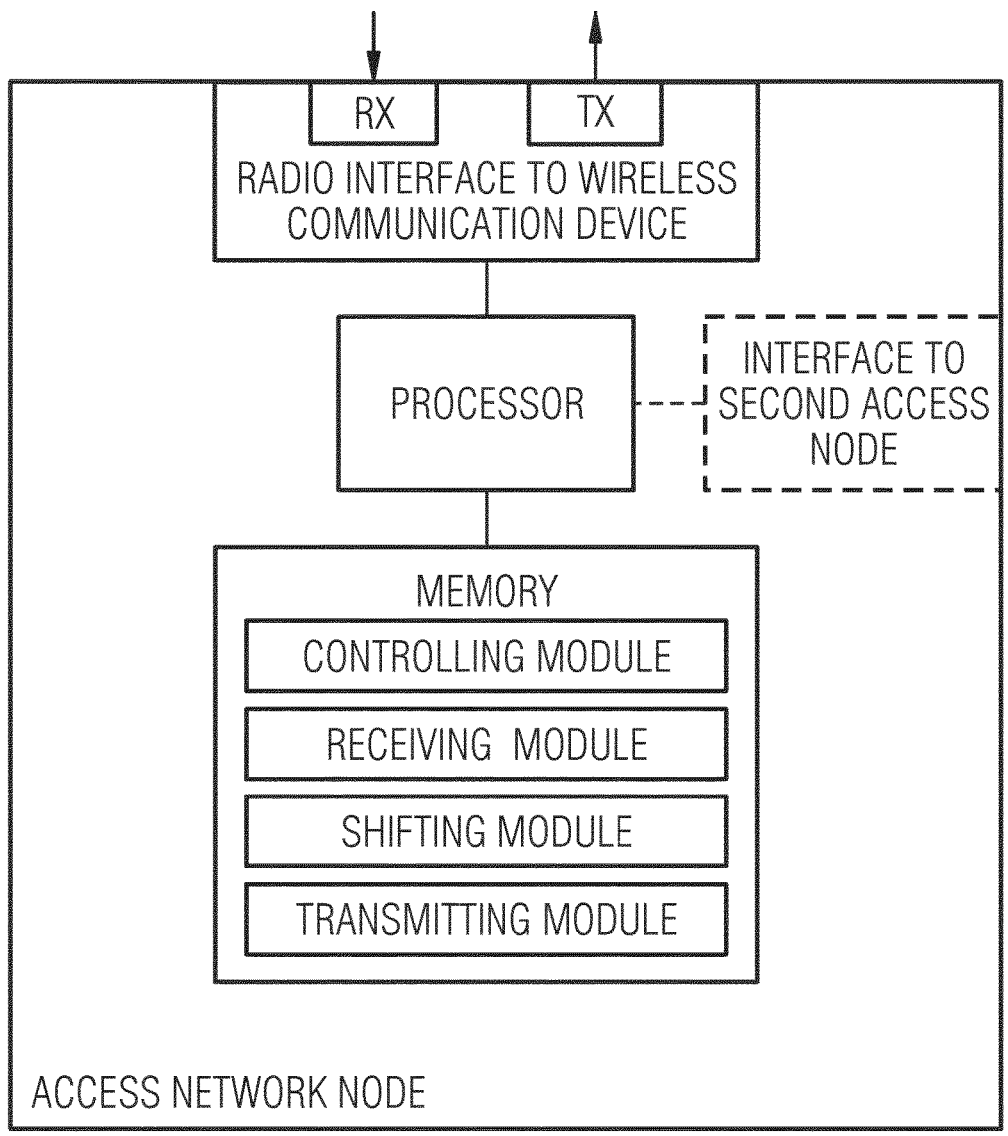
FIG. 25 schematically illustrates exemplary structures of an access network node.

Now referring to FIG. 25 exemplary structures for implementing the above-described concepts in the access network node is shown. In the illustrated structure, the access network node includes a radio interface for performing data transmission to or from the wireless communication device. It is to be understood that for implementing transmitter (TX) functionalities the radio interface includes one or more transmitters, and that for implementing receiver functionalities (RX) functionalities the radio interface may include one or more receivers. In the above-mentioned LTE or WLAN scenario, the radio interface may correspond to the Uu interface of the Evolved Universal Terrestrial Radio Access Network (E-UTRAN) or according to IEEE 802.11 a/h, b/g, n, ac and/or make use of radio frequencies according to IEEE 802.11 a/h, b/g, n, ac and/or data rates according to IEEE 802.11 a/h, b/g, n, ac. Further, the access network node may comprise a further interface for performing data transmission to and from a further access network node via a second link. The interface may enable wireless and/or wired transmission. Alternatively, the access network node may only comprise one interface implementing functionalities of the above described interfaces.

It should be understood that the radio interface to the wireless communication device and the interface to the further access node may be combined in one interface only.

Further, the access network node includes a processor coupled to the radio interface and a memory coupled to the processor. The memory may include a ROM, e.g., a flash ROM, a RAM, e.g., a DRAM or SRAM, a mass storage, e.g., a hard disk or solid state disk, or the like. The memory includes suitably configured program code to be executed by the processor so as to implement the above-described functionalities of the first access node. More specifically, the memory may include a module for accomplishing provision of: Transmitting in a first subframe of a transmission scheme a first set of resource blocks ($N^{PRS}$) allocated to transmit positioning reference signals (PRS), said first set of resource blocks corresponding to a first range of the system bandwidth ($N^{RB}$), and Transmitting in a subsequent, second subframe of said transmission scheme a second set of resource blocks ($N^{PRS}$) allocated to transmit positioning reference signals (PRS), said second set of resource blocks corresponding to a second range of the system bandwidth ($N^{RB}$).

Additionally, the memory may include a module for accomplishing provision of: Transmitting in a subframe of a transmission scheme a first set of resource blocks (NPRS) allocated to transmit positioning reference signals (PRS), said first set of resource blocks corresponding to a first range of the system bandwidth (NRB), and Transmitting in said subframe of said transmission scheme a second set of resource blocks (NPRS) allocated to transmit positioning reference signals (PRS), said second set of resource bocks corresponding to a second range of the system bandwidth (NRB).

Additionally, the memory may include a module for accomplishing provision of: Transmitting a first set of resource blocks (NPRS) allocated to transmit positioning reference signals (PRS), Transmitting a second set of resource blocks (NPRS) allocated to transmit positioning reference signals (PRS), wherein the first and the second set of resource blocks contain a different number of positioning reference signals (PRS).

Additionally, the memory may include a module for accomplishing provision of: Transmitting a different number of PRS in different resource blocks of the same subframe of said transmission scheme.

It is to be understood that the structure as illustrated in FIG. 25 is merely schematic and that the access network node may actually include further components which, for the sake of clarity, have not been illustrated, e.g., further interfaces or additional processors. Also, it is to be understood that the memory of the second node may include further types of program code modules, which have not been illustrated. For example, the memory may include program code modules for implementing typical functionalities of an access node, e.g. LTE and/or WLAN, or program code of one or more applications to be executed by the processor. According to some embodiments, also a computer program product may be provided for implementing concepts according to embodiments of the embodiments disclosed herein, e.g., a computer-readable medium storing the program code and/or other data to be stored in the memory.

The access network node may further comprise one or modules for carrying out the embodiments as described with regards to FIGS. 1 to 23.

The at least one processor of the access network node is operative to transmit, via the interface, the first and/or second set of resource blocks and/or to shift the transmitting frequency (range) and/or to transmit the any one of the indications mentioned in the embodiments.

Figure 26:
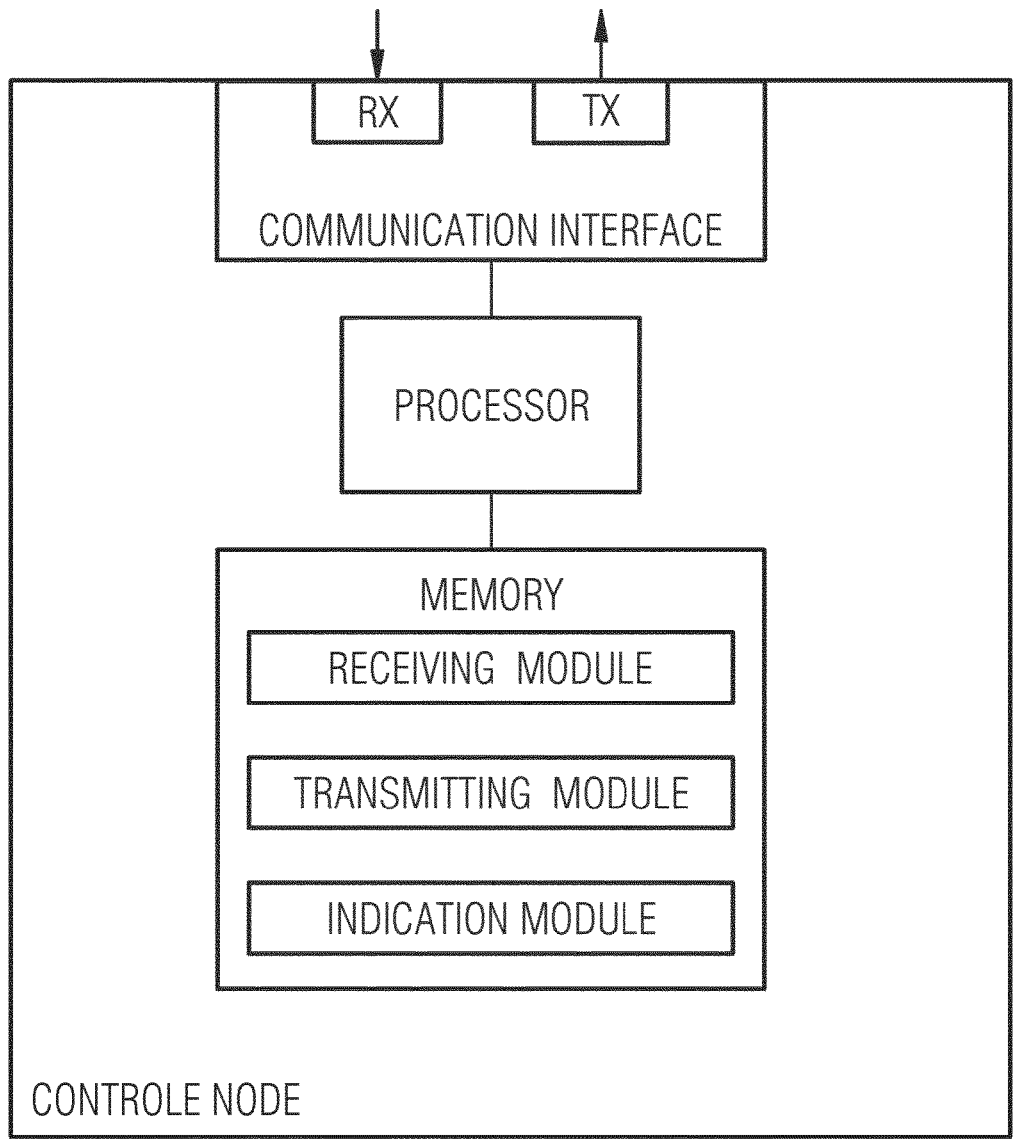
FIG. 26 schematically illustrates exemplary structures of a control node.

Now referring to FIG. 26, exemplary structures for implementing the above-described concepts in the control node are shown. In the illustrated structure, the control node includes an interface for performing data transmission to or from the first access node via a first radio link. Additionally, the control node may include an interface to communicate with the wireless communication device. However communication with the wireless communication device may very well be performed via the access network node.

Further, the control node includes a processor coupled to interface and a memory coupled to the processor. The memory may include a ROM, e.g., a flash ROM, a RAM, e.g., a DRAM or SRAM, a mass storage, e.g., a hard disk or solid state disk, or the like. The memory includes suitably configured program code to be executed by the processor so as to implement the above-described functionalities of the wireless communication device.

More specifically, the memory may include a module for accomplishing provision of: Indicating a first set of resource blocks (NPRS) allocated to transmit positioning reference signals (PRS) in a first subframe of a transmission scheme applied by an access network node, said first set of resource blocks corresponding to a first range of the system bandwidth (NRB), and Indicating a second set of resource blocks (NPRS) allocated to transmit positioning reference signals (PRS) in a subsequent, second subframe of said transmission scheme applied by said access network node, said second set of resource blocks corresponding to a second range of the system bandwidth (NRB).

Additionally, the memory may include a module for accomplishing provision of: Indicating to the wireless communication device to shift of the receiving frequency range of from at least partially covering the first range to at least partially covering the second range.

Additionally, the memory may include a module for accomplishing provision of: Indicating a first set of resource blocks allocated to transmit positioning reference signals in a subframe of said transmission scheme applied by said access network node, said first set of resource blocks corresponding to a first range of the system bandwidth, and Indicating a second set of resource blocks allocated to transmit positioning reference signals in said subframe of said transmission scheme applied by said access network node said second set of resource blocks corresponding to a second range of the system bandwidth.

In addition, corresponding modules for receiving and transmitting according indications may be foreseen.

It is to be understood that the structure as illustrated in FIG. 26 is merely schematic and that the control node may actually include further components which, for the sake of clarity, have not been illustrated, e.g., further interfaces or additional processors. Also, it is to be understood that the memory of the control node may include further types of program code modules, which have not been illustrated. For example, the memory may include program code modules for implementing typical functionalities of a control node or program code of one or more applications to be executed by the processor. According to some embodiments, also a computer program product may be provided for implementing concepts according to embodiments disclosed herein, e.g., a computer-readable medium storing the program code and/or other data to be stored in the memory.

The control node may further comprise one or modules for carrying out the embodiments as described with regard to FIGS. 1-23.

The at least one processor of the control node is operative to transmit, via the interface, the first and/or second set of resource blocks and/or to shift the receiving frequency range and/or to transmit the any one of the indications mentioned in the embodiments.

Modifications and other embodiments of the disclosed embodiment(s) will come to mind to one skilled in the art having the benefit of the teachings presented in the foregoing descriptions and the associated drawings. Therefore, it is to be understood that the described embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A wireless communication device operative to receive resource blocks in a shiftable receiving frequency range within a system bandwidth for transmission of resource blocks allocated to transmit positioning reference signals (PRS), the receiving frequency range being smaller than the system bandwidth, the wireless communication device comprising:

radio interface circuitry configured to communicate with an access network node; and processing circuitry operatively associated with the radio interface circuitry and the processing circuitry configured to:

receive, in a first subframe of a transmission scheme applied by the access network node, a first set of resource blocks allocated to transmit PRS, the first set of resource blocks corresponding to a first range of the system bandwidth;

receive, in a subsequent second subframe of the transmission scheme applied by the access network node, a second set of resource blocks allocated to transmit PRS, the second set of resource blocks corresponding to a second range of the system bandwidth;

shift the receiving frequency range, from at least partially covering the first range to at least partially covering the second range, based on at least a predetermined shifting sequence; and shift the receiving frequency range to a third range of the system bandwidth allocated to transmit control data and/or payload data transmission, wherein the third range of the system bandwidth does not overlap with the first or second range of the system bandwidth.

2. The wireless communication device according to claim 1, wherein the first and the second sets of resource blocks contain a different number of PRS.

3. The wireless communication device according to claim 1, wherein the processing circuitry is configured to shift the receiving frequency range, from the at least partially covering the first range to the at least partially covering the second range, further based on at least one of:

a pseudo-random sequence, an expected signal strength, an access network node ID, and a subframe index.

4. The wireless communication device according to claim 1, wherein the processing circuitry is configured to receive the first set of resource blocks being centered around a central frequency of the system bandwidth.

5. The wireless communication device according to claim 1, wherein the first set of resource blocks comprises more resource blocks than the second set of resource blocks.

6. The wireless communication device according to claim 1, wherein the first range of the system bandwidth covered by the first set of resource blocks corresponds to the receiving frequency range of the wireless communication device.

7. The wireless communication device according to claim 1, wherein the second range of the system bandwidth covered by the second set of resource blocks corresponds to the receiving frequency range of the wireless communication device.

8. The wireless communication device according to claim 1, wherein the second set of resource blocks is eccentric with regard to a central frequency of the system bandwidth.

9. The wireless communication device according to claim 1, wherein the first range and the second range of the system bandwidth are non-overlapping.

10. The wireless communication device according to claim 1, wherein the first range and the second range of the system bandwidth are at least partially overlapping.

11. The wireless communication device according to claim 1, wherein the processing circuitry is configured to shift the receiving frequency range to a particular range of the system bandwidth on which the resource blocks are allocated to transmit PRS.

12. The wireless communication device according to claim 1, wherein the processing circuitry is further configured to transmit an indication indicating a range of the system bandwidth, corresponding to the receiving frequency range, for the first and/or second set of resource blocks allocated to transmit PRS.

13. The wireless communication device according to claim 1, wherein the processing circuitry is further configured to receive an indication indicating a range of the system bandwidth, corresponding to the receiving frequency range, for the first and/or second set of resource blocks allocated to transmit PRS.

14. The wireless communication device according to claim 1, wherein the processing circuitry is configured to receive the first set of resource blocks via a first antenna port and receive the second set of resource blocks via a second antenna port.

15. The wireless communication device according to claim 1, wherein the processing circuitry is further configured to transmit an indication indicating an antenna port via which the first and/or the second set of resource blocks shall be transmitted.

16. The wireless communication device according to claim 1, wherein the processing circuitry is further configured to decode the first and/or the second set of resource blocks in case a collision, of the first and/or the second range with resource blocks comprising control signals, occurs.

17. An access network node of a wireless communication network, the access network node comprising:
   radio interface circuitry configured to communicate with wireless communication devices; and
   processing circuitry operatively associated with the radio interface circuitry and the processing circuitry configured to:
      transmit resource blocks in a receiving frequency range of a wireless communication device within a system bandwidth for transmission of the resource blocks, the receiving frequency range of the wireless communication device being smaller than the system bandwidth;
      transmit, in a first subframe of a transmission scheme, a first set of resource blocks allocated to transmit positioning reference signals (PRS), the first set of resource blocks corresponding to a first range of the system bandwidth;
      transmit, in a subsequent second subframe of the transmission scheme, a second set of resource blocks allocated to transmit PRS, the second set of resource blocks corresponding to a second range of the system bandwidth;
      shift a transmitting range of the access network node, from at least partially covering the first range to at least partially covering the second range, based on at least a predetermined shifting sequence; and
      transmit on a third range of the system bandwidth allocated to transmit control data and/or payload data transmission, wherein the third range of the system bandwidth does not overlap with the first or second range of the system bandwidth.

18. The access network node according to claim 17, wherein the first and the second sets of resource blocks contain a different number of PRS.

19. The access network node according to claim 17, wherein the processing circuitry is configured to shift the first and/or second range based on at least one of:
   a pseudo-random sequence,
   an expected signal strength,
   an access network node ID, and
   a subframe index.

20. The access network node according to claim 17, wherein the processing circuitry is configured to transmit the first set of resource blocks being centered around a central frequency of the system bandwidth.

21. The access network node according to claim 17, wherein the first set of resource blocks comprises more resource blocks than the second set of resource blocks.

22. The access network node according to claim 17, wherein the first range of the system bandwidth covered by the first set of resource blocks corresponds to the receiving frequency range of the wireless communication device.

23. The access network node according to claim 17, wherein the second range of the system bandwidth covered by the second set of resource blocks corresponds to the receiving frequency range of the wireless communication device.

24. The access network node according to claim 17, wherein the second set of resource blocks is eccentric with regard to a central frequency of the system bandwidth.

25. The access network node according to claim 17, wherein the first range and the second range of the system bandwidth are non-overlapping.

26. The access network node according to claim 17, wherein the first range and the second range of the system bandwidth are at least partially overlapping.

27. The access network node according to claim 17, wherein the processing circuitry is configured to shift a particular range of the system bandwidth on which resource blocks are allocated to transmit PRS to the receiving frequency range of the wireless communication device.

28. The access network node according to claim 17, wherein the processing circuitry is further configured to transmit an indication indicating a range of the system bandwidth, corresponding to the receiving frequency range, for the first and/or second set of resource blocks allocated to transmit PRS.

29. The access network node according to claim 17, wherein the processing circuitry is further configured to receive an indication indicating a range of the system bandwidth, corresponding to the receiving frequency range, for the first and/or second set of resource blocks allocated to transmit PRS.

30. The access network node according to claim 17, wherein the processing circuitry is configured to transmit the first set of resource blocks via a first antenna port and transmit the second set of resource blocks via a second antenna port.

31. The access network node according to claim 17, wherein the processing circuitry is further configured to receive an indication indicating an antenna port via which the first and/or the second set of resource blocks shall be transmitted.

32. The access network node according to claim 17, wherein the processing circuitry is configured to transmit the first and/or the second set of resource blocks in the first and/or second range of the system bandwidth on resource blocks comprising control signals.

33. A method for operating a wireless communication device, the method comprising:
  receiving resource blocks in a shiftable receiving frequency range within a system bandwidth for transmission of resource blocks allocated to transmit positioning reference signals (PRS), the receiving frequency range being smaller than the system bandwidth;
  receiving, in a first subframe of a transmission scheme applied by an access network node, a first set of resource blocks allocated to transmit PRS, the first set of resource blocks corresponding to a first range of the system bandwidth;
  shifting the receiving frequency range, from at least partially covering the first range to at least partially covering a second range, based on at least a predetermined shifting sequence;
  receiving, in a subsequent second subframe of the transmission scheme applied by the access network node, a second set of resource blocks allocated to transmit PRS, the second set of resource blocks corresponding to the second range of the system bandwidth; and
  shifting the receiving frequency range to a third range of the system bandwidth allocated to transmit control data and/or payload data transmission, wherein the third range of the system bandwidth does not overlap with the first or second range of the system bandwidth.

34. The method according to claim 33, wherein the first and the second sets of resource blocks contain a different number of PRS.

35. The method according to claim 33, wherein shifting the receiving frequency range is further based on at least one of:
  a pseudo-random sequence,
  an expected signal strength,
  an access network node ID, and
  a subframe index.

36. The method according to claim 33, wherein receiving the first set of resource blocks comprises receiving the first set of resource blocks being centered around a central frequency of the system bandwidth.

37. The method according to claim 33, wherein the first set of resource blocks comprises more resource blocks than the second set of resource blocks.

38. The method according to claim 33, wherein the first range of the system bandwidth covered by the first set of resource blocks corresponds to the receiving frequency range of the wireless communication device.

39. The method according to claim 33, wherein the second range of the system bandwidth covered by the second set of resource blocks corresponds to the receiving frequency range of the wireless communication device.

40. The method according to claim 33, wherein the second set of resource blocks is eccentric with regard to a central frequency of the system bandwidth.

41. The method according to claim 33, wherein the first range and the second range of the system bandwidth are non-overlapping.

42. The method according to claim 33, wherein the first range and the second range of the system bandwidth are at least partially overlapping.

43. The method according to claim 33, wherein shifting the receiving frequency range comprises shifting the receiving frequency range to a particular range of the system bandwidth on which the resource blocks are allocated to transmit PRS.

44. The method according to claim 33, further comprising transmitting an indication indicating a range of the system bandwidth, corresponding to the receiving frequency range, for the first and/or second set of resource blocks allocated to transmit PRS.

45. The method according to claim 33, further comprising receiving an indication indicating a range of the system bandwidth, corresponding to the receiving frequency range, for the first and/or second set of resource blocks allocated to transmit PRS.

46. The method according to claim 33, wherein receiving the first and second sets of resource blocks comprises receiving the first set of resource blocks via a first antenna port and receiving the second set of resource blocks via a second antenna port.

47. The method according to claim 33, further comprising transmitting an indication indicating an antenna port via which the first and/or the second set of resource blocks shall be transmitted.

48. The method according to claim 33, further comprising decoding the first and/or the second set of resource blocks in case a collision, of the first and/or the second range with resource blocks comprising control signals, occurs.

49. A method for operating an access network node of a wireless communication network, the method comprising:
  transmitting resource blocks in a receiving frequency range of a wireless communication device within a system bandwidth for transmission of the resource blocks, the receiving frequency range of the wireless communication device being smaller than the system bandwidth;
  transmitting, in a first subframe of a transmission scheme, a first set of resource blocks allocated to transmit positioning reference signals (PRS), the first set of resource blocks corresponding to a first range of the system bandwidth;
  transmitting, in a subsequent second subframe of the transmission scheme, a second set of resource blocks allocated to transmit PRS, the second set of resource blocks corresponding to a second range of the system bandwidth;
  shifting a transmitting range of the access network node, from at least partially covering the first range to at least partially covering the second range of the system bandwidth, based on at least a predetermined shifting sequence; and transmitting on a third range of the system bandwidth allocated to transmit control data and/or payload data transmission, wherein the third range of the system bandwidth does not overlap with the first or second range of the system bandwidth.

50. The method according to claim 49, wherein the first and the second sets of resource blocks contain a different number of PRS.

51. The method according to claim 49, further comprising shifting the first and/or second range based on at least one of:
   a pseudo-random sequence,
   an expected signal strength,
   an access network node ID, and
   a subframe index.

52. The method according to claim 49, wherein transmitting the first set of resource blocks comprises transmitting the first set of resource blocks being centered around a central frequency of the system bandwidth.

53. The method according to claim 49, wherein the first set of resource blocks comprises more resource blocks than the second set of resource blocks.

54. The method according to claim 49, wherein the first range of the system bandwidth covered by the first set of resource blocks corresponds to the receiving frequency range of the wireless communication device.

55. The method according to claim 49, wherein the second range of the system bandwidth covered by the second set of resource blocks corresponds to the receiving frequency range of the wireless communication device.

56. The method according to claim 49, wherein the second set of resource blocks is eccentric with regard to a central frequency of the system bandwidth.

57. The method according to claim 49, wherein the first range and the second range of the system bandwidth are non-overlapping.

58. The method according to claim 49, wherein the first range and the second range of the system bandwidth are at least partially overlapping.

59. The method according to claim 49, further comprising shifting a particular range of the system bandwidth on which resource blocks are allocated to transmit PRS to the receiving frequency range of the wireless communication device.

60. The method according to claim 49, further comprising transmitting an indication indicating a range of the system bandwidth, corresponding to the receiving frequency range, for the first and/or second set of resource blocks allocated to transmit PRS.

61. The method according to claim 49, further comprising receiving an indication indicating a range of the system bandwidth, corresponding to the receiving frequency range, for the first and/or second set of resource blocks allocated to transmit PRS.

62. The method according to claim 49, wherein transmitting the first and second sets of resource blocks comprises transmitting the first set of resource blocks via a first antenna port and transmitting the second set of resource blocks via a second antenna port.

63. The method according to claim 49, further comprising receiving an indication indicating an antenna port via which the first and/or the second set of resource blocks shall be transmitted.

64. The method according to claim 49, wherein transmitting the first and/or the second set of resource blocks comprises transmitting the first and/or the second set of resource blocks in a range of the system bandwidth on resource blocks comprising control signals.

* * * * *